US011886918B2

(12) United States Patent
Varma et al.

(10) Patent No.: US 11,886,918 B2
(45) Date of Patent: Jan. 30, 2024

(54) APPARATUS AND METHOD FOR DYNAMIC CONTROL OF MICROPROCESSOR CONFIGURATION

(71) Applicant: INTEL CORPORATION, Santa Clara, CA (US)

(72) Inventors: Ankush Varma, Portland, OR (US); Nikhil Gupta, Portland, OR (US); Vasudevan Srinivasan, Portland, OR (US); Krishnakanth Sistla, Portland, OR (US); Nilanjan Palit, Northborough, MA (US); Abhinav Karhu, Hillsboro, OR (US); Eugene Gorbatov, Hillsboro, OR (US); Eliezer Weissmann, Haifa (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 17/717,859

(22) Filed: Apr. 11, 2022

(65) Prior Publication Data
US 2022/0244996 A1 Aug. 4, 2022

Related U.S. Application Data

(63) Continuation of application No. 16/833,595, filed on Mar. 28, 2020, now Pat. No. 11,301,298.

(51) Int. Cl.
*G06F 9/50* (2006.01)
*G06F 9/48* (2006.01)
*G06F 9/54* (2006.01)
*G06F 15/80* (2006.01)

(52) U.S. Cl.
CPC .......... *G06F 9/5027* (2013.01); *G06F 9/4812* (2013.01); *G06F 9/4881* (2013.01); *G06F 9/542* (2013.01); *G06F 15/8038* (2013.01)

(58) Field of Classification Search
CPC ..................................................... G06F 9/5027
See application file for complete search history.

(56) References Cited

U.S. PATENT DOCUMENTS

| 6,112,016 | A | * | 8/2000 | MacWilliams | ..... G06F 12/0831 |
| | | | | | 710/107 |
| 8,775,787 | B2 | * | 7/2014 | Axnix | ..................... G06F 9/468 |
| | | | | | 709/221 |
| 2004/0133816 | A1 | * | 7/2004 | Miyairi | .................. G06F 1/324 |
| | | | | | 713/300 |
| 2011/0307730 | A1 | | 12/2011 | Marshall et al. | |

(Continued)

OTHER PUBLICATIONS

Office Action, EP App. No. 20209483.5, dated Nov. 24, 2022, 5 pages.

(Continued)

*Primary Examiner* — Charlie Sun
(74) *Attorney, Agent, or Firm* — NICHOLSON DE VOS WEBSTER & ELLIOTT LLP

(57) ABSTRACT

An apparatus and method for intelligently scheduling threads across a plurality of logical processors. For example, one embodiment of a processor comprises: a plurality of cores; one or more peripheral component interconnects to couple the plurality of cores to memory, and in response to a core configuration command to deactivate a core of the plurality of cores, a region within the memory is updated with an indication of deactivation of the core.

18 Claims, 25 Drawing Sheets

(56) References Cited

U.S. PATENT DOCUMENTS

2017/0205863 A1    7/2017  Lee et al.
2019/0042280 A1    2/2019  Shanbhogue et al.
2019/0102221 A1    4/2019  Ananthakrishnan et al.

OTHER PUBLICATIONS

European Search Report and Search Opinion, EP App. No. 20209483.5, dated May 6, 2021, 8 pages.
Non-Final Office Action, U.S. Appl. No. 16/833,595, dated Sep. 1, 2021, 6 pages.
Notice of Allowance, U.S. Appl. No. 16/833,595, dated Dec. 22, 2021, 5 pages.

* cited by examiner

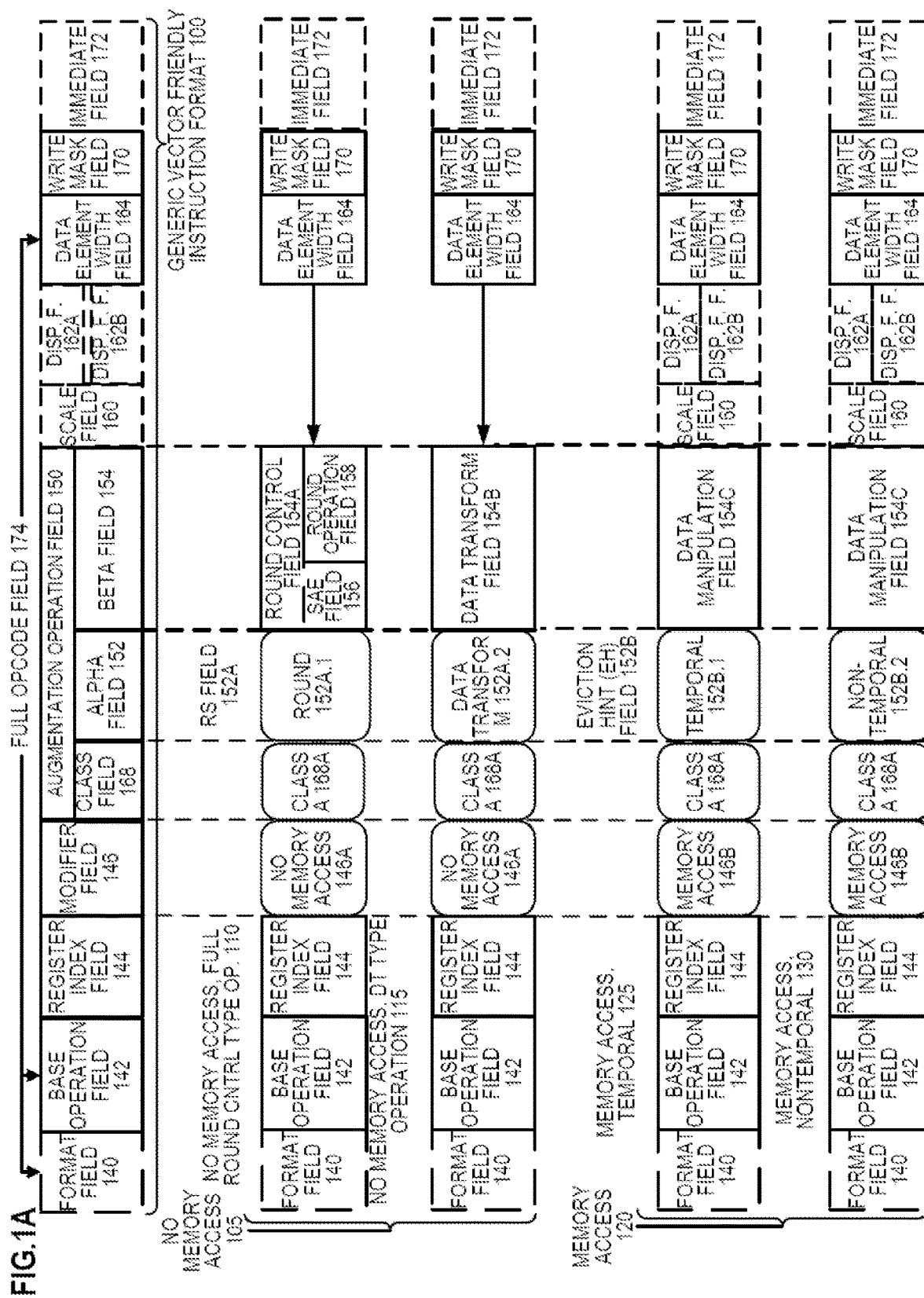

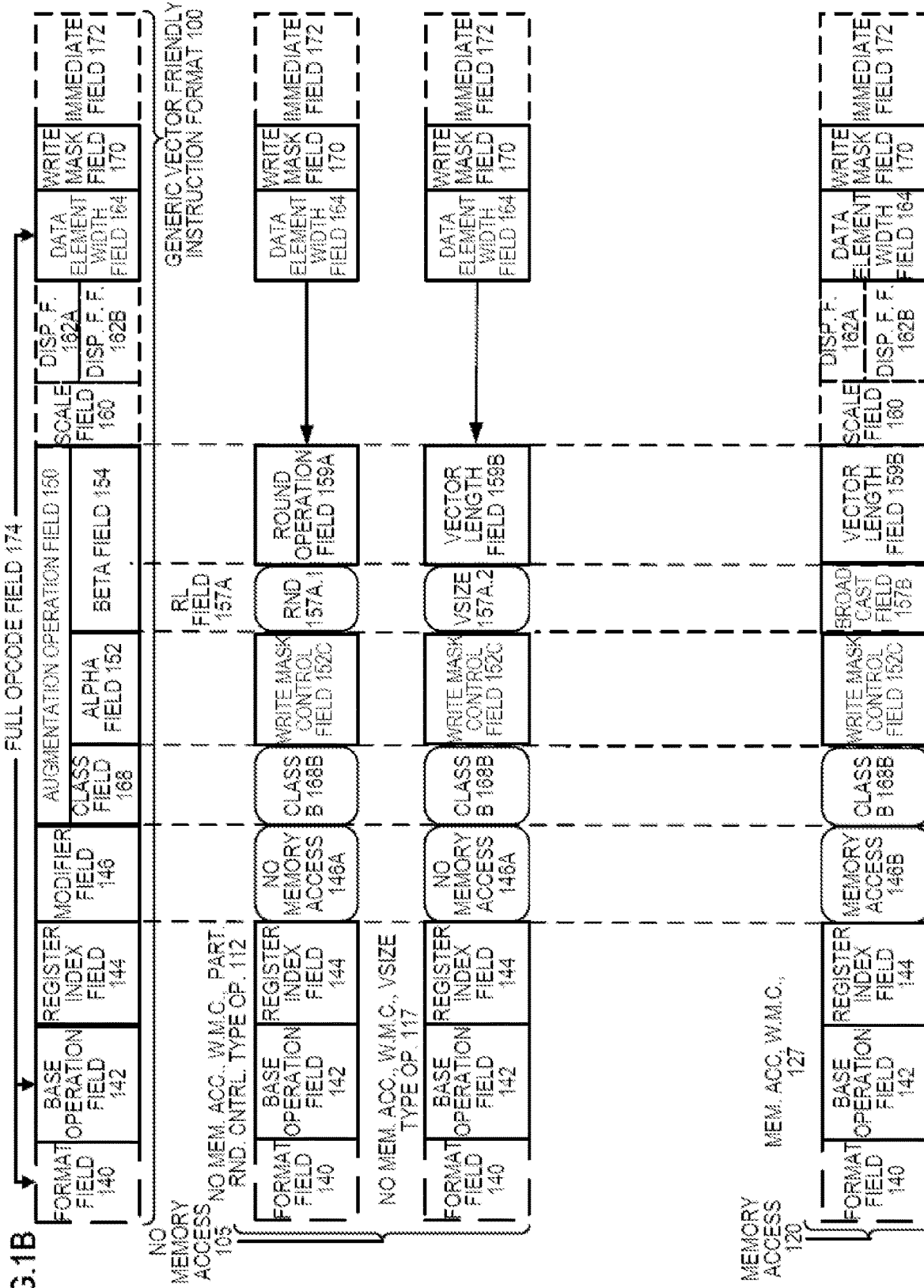

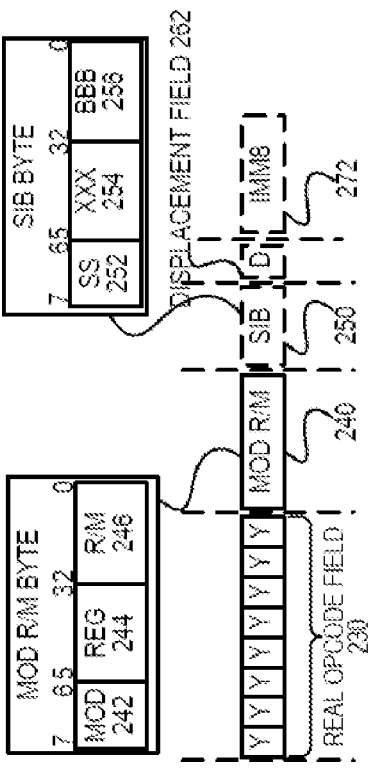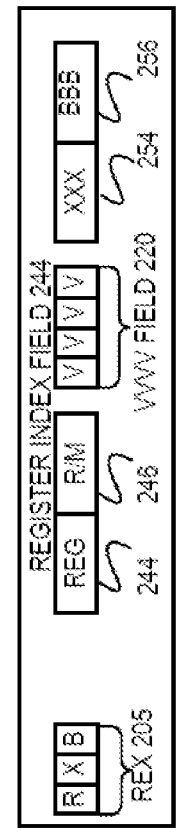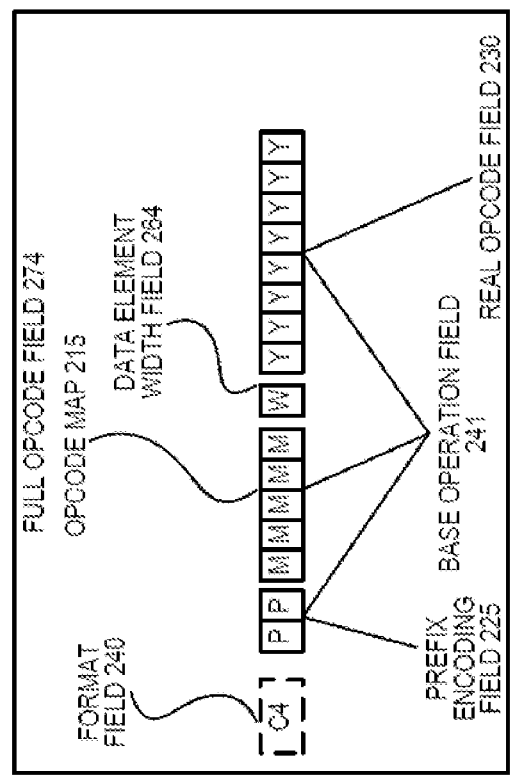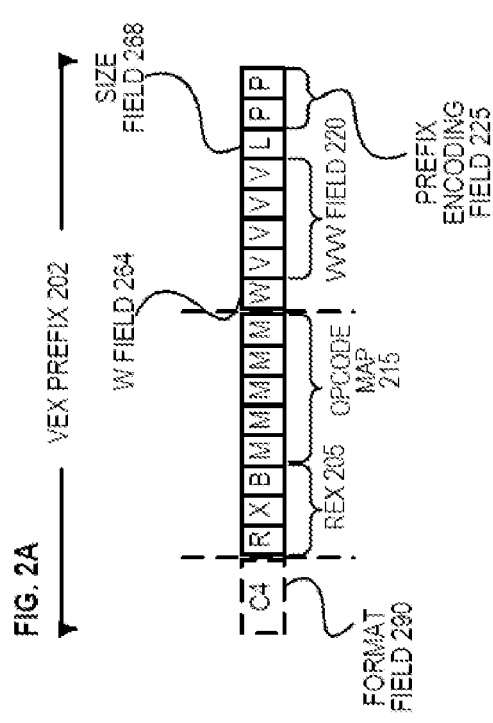

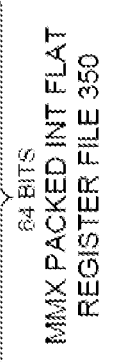
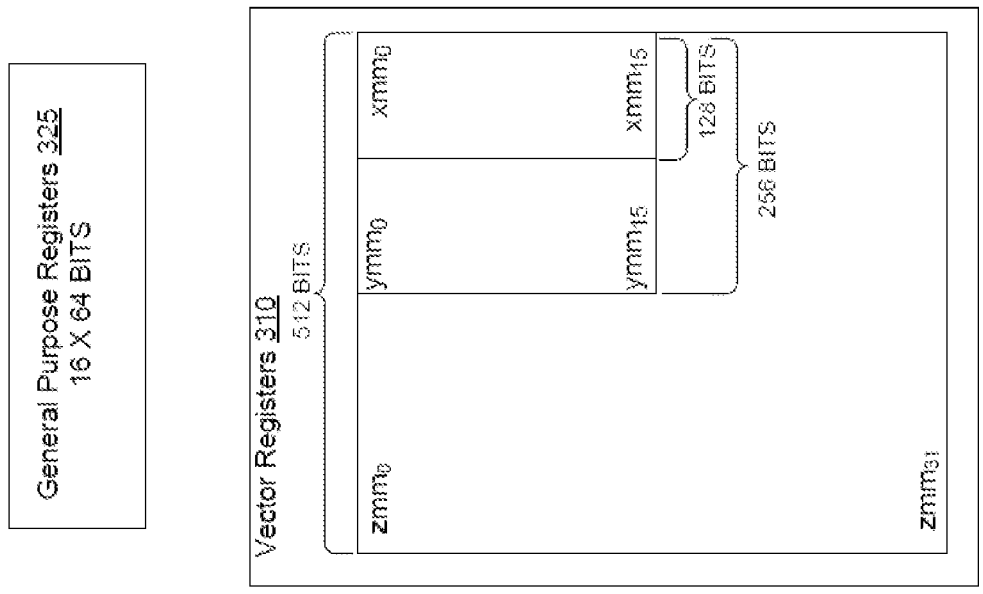
FIG. 3

APPARATUS AND METHOD FOR DYNAMIC CONTROL OF MICROPROCESSOR CONFIGURATION

CROSS-REFERENCE TO RELATED APPLICATIONS

This application is a continuation of application Ser. No. 16/833,595, filed Mar. 28, 2020, which is hereby incorporated by reference.

TECHNICAL FIELD

The embodiments of the invention relate generally to the field of computer processors. More particularly, the embodiments relate to an apparatus and method for dynamic control of microprocessor configurations.

BACKGROUND ART

Techniques such as Running Average Power Limit (RAPL), enable power limits to be changed at runtime via a register interface, but do not affect core count or guaranteed base frequency. In current implementations, hardware cannot unilaterally disable running cores that are under OS control.

Thermal design power (TDP) configuration techniques (e.g., ConfigTDP) allow certain configuration parameters to be selected from a menu of pre-selected options at runtime (e.g., TDP, base frequency etc.). However, these configuration options do not allow changes to the core count. Hardware cannot unilaterally disable running cores that are under OS control.

Intel Speed Select (ISS) allows certain processor configuration parameters to be changed by selecting from a menu of pre-selected options, but this must be done statically at boot-time; runtime updates are not possible.

None of the above implementations solves the specific problem of changing core counts and accompanying base frequencies dynamically at runtime. This limitation is a result of the fact that hardware cannot unilaterally disable running cores that are under OS control, which is required to reduce the available core count.

BRIEF DESCRIPTION OF THE DRAWINGS

A better understanding of the present invention can be obtained from the following detailed description in conjunction with the following drawings, in which:

FIGS. 1A and 1B are block diagrams illustrating a generic vector friendly instruction format and instruction templates thereof according to embodiments of the invention;

FIGS. 2A-C are block diagrams illustrating an exemplary VEX instruction format according to embodiments of the invention;

FIG. 3 is a block diagram of a register architecture according to one embodiment of the invention.

DETAILED DESCRIPTION

Figure 4A:
FIG. 4A is a block diagram illustrating both an exemplary in-order fetch, decode, retire pipeline and an exemplary register renaming, out-of-order issue/execution pipeline according to embodiments of the invention.

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Processor Architectures, Instruction Formats, and Data Types

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

FIGS. 1A-1B are block diagrams illustrating a generic vector friendly instruction format and instruction templates thereof according to embodiments of the invention. FIG. 1A is a block diagram illustrating a generic vector friendly instruction format and class A instruction templates thereof according to embodiments of the invention; while FIG. 1B is a block diagram illustrating the generic vector friendly instruction format and class B instruction templates thereof according to embodiments of the invention. Specifically, a generic vector friendly instruction format 100 for which are defined class A and class B instruction templates, both of which include no memory access 105 instruction templates and memory access 120 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 1A include: 1) within the no memory access 105 instruction templates there is shown a no memory access, full round control type operation 110 instruction template and a no memory access, data transform type operation 115 instruction template; and 2) within the memory access 120 instruction templates there is shown a memory access, temporal 125 instruction template and a memory access, non-temporal 130 instruction template. The class B instruction templates in FIG. 1B include: 1) within the no memory access 105 instruction templates there is shown a no memory access, write mask control, partial round control type operation 112 instruction template and a no memory access, write mask control, vsize type operation 117 instruction template; and 2) within the memory access 120 instruction templates there is shown a memory access, write mask control 127 instruction template.

The generic vector friendly instruction format 100 includes the following fields listed below in the order illustrated in FIGS. 1A-1B.

Format field 140—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 142—its content distinguishes different base operations.

Register index field 144—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 146—its content distinguishes occurrences of instructions in the generic vector instruction format that specify memory access from those that do not; that is, between no memory access 105 instruction templates and memory access 120 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 150—its content distinguishes which one of a variety of different operations to be performed in addition to the base operation. This field is context specific. In one embodiment of the invention, this field is divided into a class field 168, an alpha field 152, and a beta field 154. The augmentation operation field 150 allows common groups of operations to be performed in a single instruction rather than 2, 3, or 4 instructions.

Scale field 160—its content allows for the scaling of the index field's content for memory address generation (e.g., for address generation that uses $2^{scale}$*index+base).

Displacement Field 162A—its content is used as part of memory address generation (e.g., for address generation that uses $2^{scale}$*index+base+displacement).

Displacement Factor Field 162B (note that the juxtaposition of displacement field 162A directly over displacement factor field 162B indicates one or the other is used)—its content is used as part of address generation; it specifies a displacement factor that is to be scaled by the size of a memory access (N)—where N is the number of bytes in the memory access (e.g., for address generation that uses $2^{scale}*\text{index}+\text{base}+\text{scaled displacement}$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 174 (described later herein) and the data manipulation field 154C. The displacement field 162A and the displacement factor field 162B are optional in the sense that they are not used for the no memory access 105 instruction templates and/or different embodiments may implement only one or none of the two.

Data element width field 164—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 170—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 170 allows for partial vector operations, including loads, stores, arithmetic, logical, etc. While embodiments of the invention are described in which the write mask field's 170 content selects one of a number of write mask registers that contains the write mask to be used (and thus the write mask field's 170 content indirectly identifies that masking to be performed), alternative embodiments instead or additional allow the mask write field's 170 content to directly specify the masking to be performed.

Immediate field 172—its content allows for the specification of an immediate. This field is optional in the sense that is it not present in an implementation of the generic vector friendly format that does not support immediate and it is not present in instructions that do not use an immediate.

Class field 168—its content distinguishes between different classes of instructions. With reference to FIGS. 1A-B, the contents of this field select between class A and class B instructions. In FIGS. 1A-B, rounded corner squares are used to indicate a specific value is present in a field (e.g., class A 168A and class B 168B for the class field 168 respectively in FIGS. 1A-B).

Instruction Templates of Class A

In the case of the non-memory access 105 instruction templates of class A, the alpha field 152 is interpreted as an RS field 152A, whose content distinguishes which one of the different augmentation operation types are to be performed (e.g., round 152A.1 and data transform 152A.2 are respectively specified for the no memory access, round type operation 110 and the no memory access, data transform type operation 115 instruction templates), while the beta field 154 distinguishes which of the operations of the specified type is to be performed. In the no memory access 105 instruction templates, the scale field 160, the displacement field 162A, and the displacement scale filed 162B are not present.

No-Memory Access Instruction Templates—Full Round Control Type Operation

In the no memory access full round control type operation 110 instruction template, the beta field 154 is interpreted as a round control field 154A, whose content(s) provide static rounding. While in the described embodiments of the invention the round control field 154A includes a suppress all floating point exceptions (SAE) field 156 and a round operation control field 158, alternative embodiments may support may encode both these concepts into the same field or only have one or the other of these concepts/fields (e.g., may have only the round operation control field 158).

SAE field 156—its content distinguishes whether or not to disable the exception event reporting; when the SAE field's 156 content indicates suppression is enabled, a given instruction does not report any kind of floating-point exception flag and does not raise any floating point exception handler.

Round operation control field 158—its content distinguishes which one of a group of rounding operations to perform (e.g., Round-up, Round-down, Round-towards-zero and Round-to-nearest). Thus, the round operation control field 158 allows for the changing of the rounding mode on a per instruction basis. In one embodiment of the invention where a processor includes a control register for specifying rounding modes, the round operation control field's 150 content overrides that register value.

No Memory Access Instruction Templates—Data Transform Type Operation

In the no memory access data transform type operation 115 instruction template, the beta field 154 is interpreted as a data transform field 154B, whose content distinguishes which one of a number of data transforms is to be performed (e.g., no data transform, swizzle, broadcast).

In the case of a memory access 120 instruction template of class A, the alpha field 152 is interpreted as an eviction hint field 152B, whose content distinguishes which one of the eviction hints is to be used (in FIG. 1A, temporal 152B.1 and non-temporal 152B.2 are respectively specified for the memory access, temporal 125 instruction template and the memory access, non-temporal 130 instruction template), while the beta field 154 is interpreted as a data manipulation field 154C, whose content distinguishes which one of a number of data manipulation operations (also known as primitives) is to be performed (e.g., no manipulation; broadcast; up conversion of a source; and down conversion of a destination). The memory access 120 instruction templates include the scale field 160, and optionally the displacement field 162A or the displacement scale field 162B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 152 is interpreted as a write mask control (Z) field 152C, whose content distinguishes whether the write masking controlled by the write mask field 170 should be a merging or a zeroing.

In the case of the non-memory access 105 instruction templates of class B, part of the beta field 154 is interpreted as an RL field 157A, whose content distinguishes which one of the different augmentation operation types are to be performed (e.g., round 157A.1 and vector length (VSIZE) 157A.2 are respectively specified for the no memory access, write mask control, partial round control type operation 112 instruction template and the no memory access, write mask control, VSIZE type operation 117 instruction template), while the rest of the beta field 154 distinguishes which of the operations of the specified type is to be performed. In the no memory access 105 instruction templates, the scale field 160, the displacement field 162A, and the displacement scale filed 162B are not present.

In the no memory access, write mask control, partial round control type operation 110 instruction template, the rest of the beta field 154 is interpreted as a round operation field 159A and exception event reporting is disabled (a given instruction does not report any kind of floating-point exception flag and does not raise any floating point exception handler).

Round operation control field 159A—just as round operation control field 158, its content distinguishes which one of a group of rounding operations to perform (e.g., Round-up, Round-down, Round-towards-zero and Round-to-nearest). Thus, the round operation control field 159A allows for the changing of the rounding mode on a per instruction basis. In one embodiment of the invention where a processor includes a control register for specifying rounding modes, the round operation control field's 150 content overrides that register value.

In the no memory access, write mask control, VSIZE type operation 117 instruction template, the rest of the beta field 154 is interpreted as a vector length field 159B, whose content distinguishes which one of a number of data vector lengths is to be performed on (e.g., 128, 256, or 512 byte).

In the case of a memory access 120 instruction template of class B, part of the beta field 154 is interpreted as a broadcast field 157B, whose content distinguishes whether or not the broadcast type data manipulation operation is to be performed, while the rest of the beta field 154 is interpreted the vector length field 159B. The memory access 120 instruction templates include the scale field 160, and optionally the displacement field 162A or the displacement scale field 162B.

With regard to the generic vector friendly instruction format 100, a full opcode field 174 is shown including the format field 140, the base operation field 142, and the data element width field 164. While one embodiment is shown where the full opcode field 174 includes all of these fields, the full opcode field 174 includes less than all of these fields in embodiments that do not support all of them. The full opcode field 174 provides the operation code (opcode).

The augmentation operation field 150, the data element width field 164, and the write mask field 170 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

VEX Instruction Format

VEX encoding allows instructions to have more than two operands, and allows SIMD vector registers to be longer than 28 bits. The use of a VEX prefix provides for three-operand (or more) syntax. For example, previous two-operand instructions performed operations such as A=A+B, which overwrites a source operand. The use of a VEX prefix enables operands to perform nondestructive operations such as A=B+C.

FIG. 2A illustrates an exemplary AVX instruction format including a VEX prefix 202, real opcode field 230, Mod R/M byte 240, SIB byte 250, displacement field 262, and IMM8 272. FIG. 2B illustrates which fields from FIG. 2A make up a full opcode field 274 and a base operation field 241. FIG. 2C illustrates which fields from FIG. 2A make up a register index field 244.

VEX Prefix (Bytes 0-2) 202 is encoded in a three-byte form. The first byte is the Format Field 290 (VEX Byte 0, bits [7:0]), which contains an explicit C4 byte value (the unique value used for distinguishing the C4 instruction format). The second-third bytes (VEX Bytes 1-2) include a number of bit fields providing specific capability. Specifically, REX field 205 (VEX Byte 1, bits [7-5]) consists of a VEX.R bit field (VEX Byte 1, bit [7]-R), VEX.X bit field (VEX byte 1, bit [6]-X), and VEX.B bit field (VEX byte 1, bit[5]-B). Other fields of the instructions encode the lower three bits of the register indexes as is known in the art (rrr, xxx, and bbb), so that Rrrr, Xxxx, and Bbbb may be formed by adding VEX.R, VEX.X, and VEX.B. Opcode map field 215 (VEX byte 1, bits [4:0]-mmmmm) includes content to encode an implied leading opcode byte. W Field 264 (VEX byte 2, bit [7]-W)—is represented by the notation VEX.W, and provides different functions depending on the instruction. The role of VEX.vvvv 220 (VEX Byte 2, bits [6:3]-vvvv) may include the following: 1) VEX.vvvv encodes the first source register operand, specified in inverted (1s complement) form and is valid for instructions with 2 or more source operands; 2) VEX.vvvv encodes the destination register operand, specified in 1s complement form for certain vector shifts; or 3) VEX.vvvv does not encode any operand, the field is reserved and should contain 1111b. If VEX.L 268 Size field (VEX byte 2, bit [2]-L)=0, it indicates 28 bit vector; if VEX.L=1, it indicates 256 bit vector. Prefix encoding field 225 (VEX byte 2, bits [1:0]-pp) provides additional bits for the base operation field 241.

Real Opcode Field 230 (Byte 3) is also known as the opcode byte. Part of the opcode is specified in this field.

MOD R/M Field 240 (Byte 4) includes MOD field 242 (bits [7-6]), Reg field 244 (bits [5-3]), and R/M field 246 (bits [2-0]). The role of Reg field 244 may include the following: encoding either the destination register operand or a source register operand (the rrr of Rrrr), or be treated as an opcode extension and not used to encode any instruction operand. The role of R/M field 246 may include the following: encoding the instruction operand that references a memory address, or encoding either the destination register operand or a source register operand.

Scale, Index, Base (SIB)—The content of Scale field 250 (Byte 5) includes SS252 (bits [7-6]), which is used for memory address generation. The contents of SIB.xxx 254 (bits [5-3]) and SIB.bbb 256 (bits [2-0]) have been previously referred to with regard to the register indexes Xxxx and Bbbb.

The Displacement Field 262 and the immediate field (IMM8) 272 contain data.

Exemplary Register Architecture

FIG. 3 is a block diagram of a register architecture 300 according to one embodiment of the invention. In the embodiment illustrated, there are 32 vector registers 310 that are 512 bits wide; these registers are referenced as zmm0 through zmm31. The lower order 256 bits of the lower 6 zmm registers are overlaid on registers ymm0-15. The lower order 128 bits of the lower 6 zmm registers (the lower order 128 bits of the ymm registers) are overlaid on registers xmm0-15.

General-purpose registers 325—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 345, on which is aliased the MMX packed integer flat register file 350—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures. Detailed herein are circuits (units) that comprise exemplary cores, processors, etc.

Exemplary Core Architectures

Figure 4B:
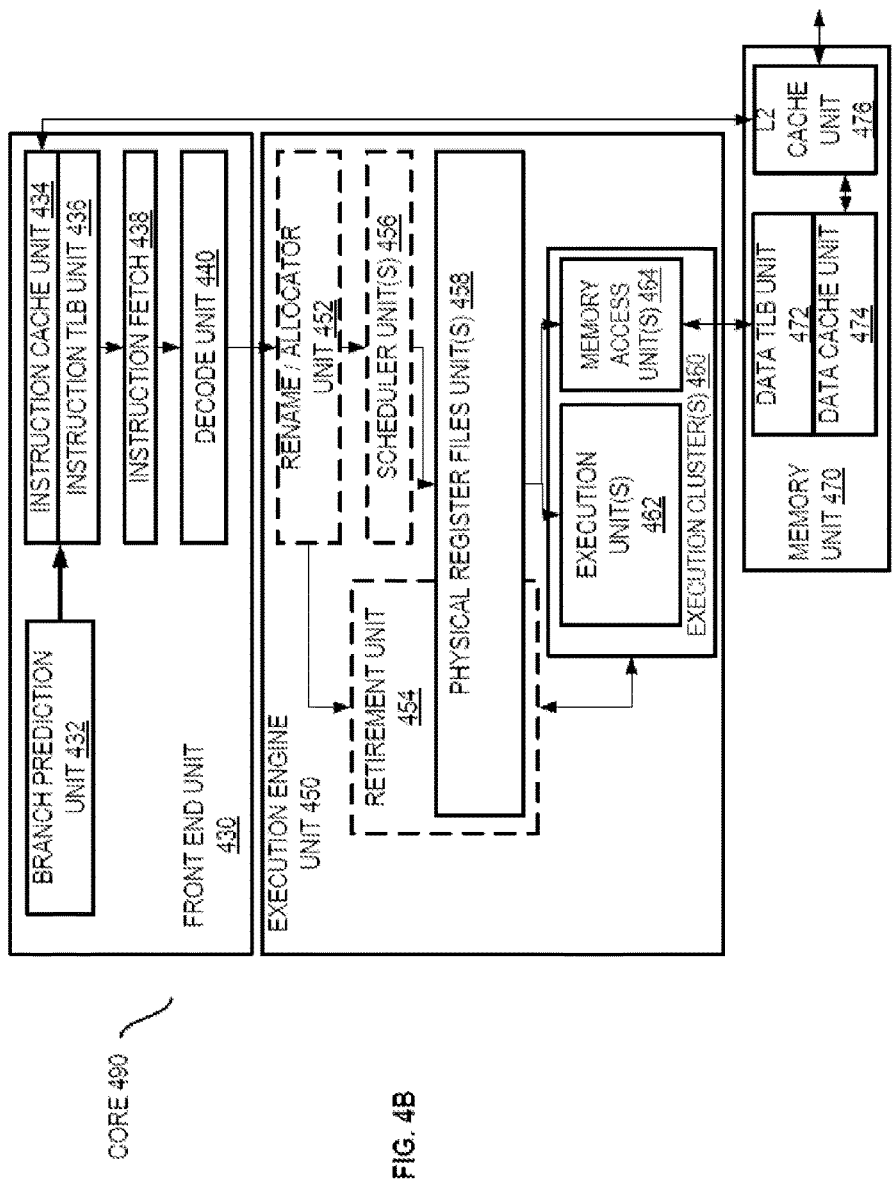
FIG. 4B is a block diagram illustrating both an exemplary embodiment of an in-order fetch, decode, retire core and an exemplary register renaming, out-of-order issue/execution architecture core to be included in a processor according to embodiments of the invention.

FIG. 4A is a block diagram illustrating both an exemplary in-order pipeline and an exemplary register renaming, out-of-order issue/execution pipeline according to embodiments of the invention. FIG. 4B is a block diagram illustrating both an exemplary embodiment of an in-order architecture core and an exemplary register renaming, out-of-order issue/execution architecture core to be included in a processor according to embodiments of the invention. The solid lined boxes in FIGS. 4A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

FIG. 4B shows processor core 490 including a front end unit 430 coupled to an execution engine unit 450, and both are coupled to a memory unit 470. The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, coprocessor core, general purpose computing graphics processing unit (GPGPU) core, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit 440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 490 includes a microcode ROM or other medium that stores microcode for certain macroinstructions (e.g., in decode unit 440 or otherwise within the front end unit 430). The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 458 comprises a vector registers unit and a scalar registers unit. These register units may provide architectural vector registers, vector mask registers, and general purpose registers. The physical register file(s) unit(s) 458 is overlapped by the retirement unit 454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The instruction cache unit 434 is further coupled to a level 2 (L2) cache unit 476 in the memory unit 470. The L2 cache unit 476 is coupled to one or more other levels of cache and eventually to a main memory.

By way of example, the exemplary register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, California; the ARM instruction set (with optional additional extensions such as NEON) of ARM Holdings of Sunnyvale, California), including the instruction(s) described herein. In one embodiment, the core 490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 5B:
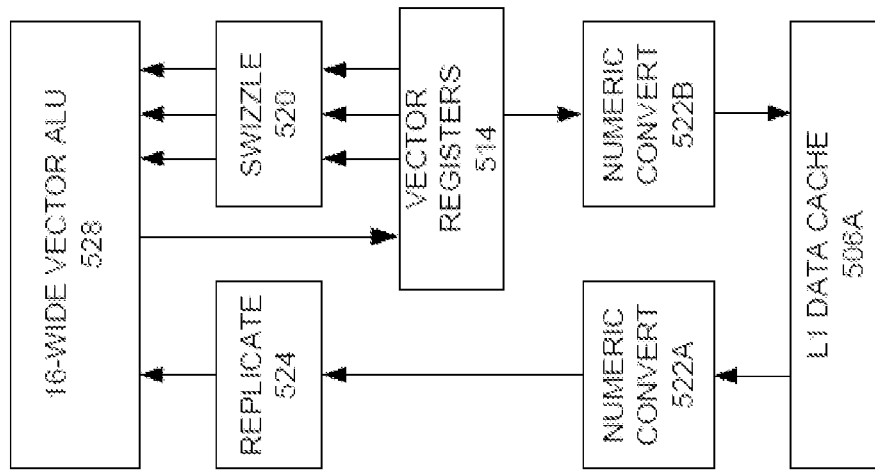
FIG. 5B illustrates an expanded view of part of the processor core in FIG. 5A according to embodiments of the invention.
Figure 5A:
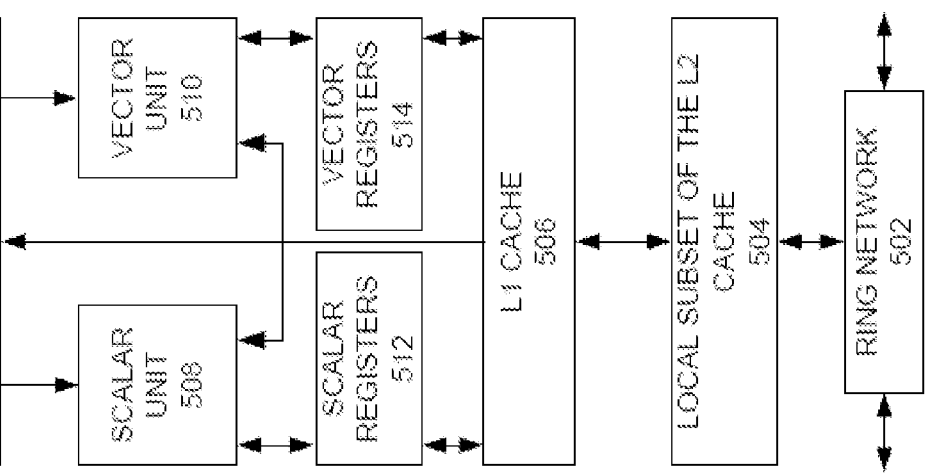
FIG. 5A is a block diagram of a single processor core, along with its connection to an on-die interconnect network.

FIGS. 5A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 5A is a block diagram of a single processor core, along with its connection to the on-die interconnect network 502 and with its local subset of the Level 2 (L2) cache 504, according to embodiments of the invention. In one embodiment, an instruction decoder 500 supports the x86 instruction set with a packed data instruction set extension. An L1 cache 506 allows low-latency accesses to cache memory into the scalar and vector units. While in one embodiment (to simplify the design), a scalar unit 508 and a vector unit 510 use separate register sets (respectively, scalar registers 512 and vector registers 514) and data transferred between them is written to memory and then read back in from a level 1 (L1) cache 506, alternative embodiments of the invention may use a different approach (e.g., use a single register set or include a communication path that allow data to be transferred between the two register files without being written and read back).

The local subset of the L2 cache 504 is part of a global L2 cache that is divided into separate local subsets, one per processor core. Each processor core has a direct access path to its own local subset of the L2 cache 504. Data read by a processor core is stored in its L2 cache subset 504 and can be accessed quickly, in parallel with other processor cores accessing their own local L2 cache subsets. Data written by a processor core is stored in its own L2 cache subset 504 and is flushed from other subsets, if necessary. The ring network ensures coherency for shared data. The ring network is bi-directional to allow agents such as processor cores, L2 caches and other logic blocks to communicate with each other within the chip. Each ring data-path is 1024-bits wide per direction in some embodiments.

FIG. 5B is an expanded view of part of the processor core in FIG. 5A according to embodiments of the invention. FIG. 5B includes an L1 data cache 506A part of the L1 cache 504, as well as more detail regarding the vector unit 510 and the vector registers 514. Specifically, the vector unit 510 is a 6-wide vector processing unit (VPU) (see the 16-wide ALU 528), which executes one or more of integer, single-precision float, and double-precision float instructions. The VPU supports swizzling the register inputs with swizzle unit 520, numeric conversion with numeric convert units 522A-B, and replication with replication unit 524 on the memory input.

Processor with Integrated Memory Controller and Graphics

Figure 6:
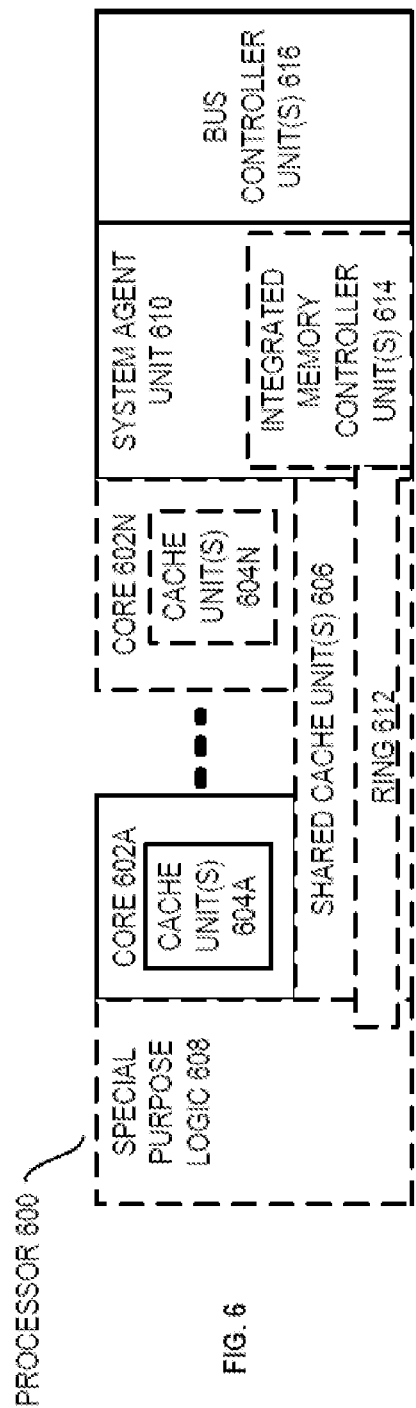
FIG. 6 is a block diagram of a single core processor and a multicore processor with integrated memory controller and graphics according to embodiments of the invention.

FIG. 6 is a block diagram of a processor 600 that may have more than one core, may have an integrated memory controller, and may have integrated graphics according to embodiments of the invention. The solid lined boxes in FIG. 6 illustrate a processor 600 with a single core 602A, a system agent 610, a set of one or more bus controller units 616, while the optional addition of the dashed lined boxes illustrates an alternative processor 600 with multiple cores 602A-N, a set of one or more integrated memory controller unit(s) 614 in the system agent unit 610, and special purpose logic 608.

Thus, different implementations of the processor 600 may include: 1) a CPU with the special purpose logic 608 being integrated graphics and/or scientific (throughput) logic (which may include one or more cores), and the cores 602A-N being one or more general purpose cores (e.g., general purpose in-order cores, general purpose out-of-order cores, a combination of the two); 2) a coprocessor with the cores 602A-N being a large number of special purpose cores intended primarily for graphics and/or scientific (throughput); and 3) a coprocessor with the cores 602A-N being a large number of general purpose in-order cores. Thus, the processor 600 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 600 may be a part of and/or may be implemented on one or more substrates using any of a number of process technologies, such as, for example, BiCMOS, CMOS, or NMOS.

The memory hierarchy includes one or more levels of cache within the cores 604A-N, a set or one or more shared cache units 606, and external memory (not shown) coupled to the set of integrated memory controller units 614. The set of shared cache units 606 may include one or more mid-level caches, such as level 2 (L2), level 3 (L3), level 4 (L4), or other levels of cache, a last level cache (LLC), and/or combinations thereof. While in one embodiment a ring based interconnect unit 612 interconnects the integrated graphics logic 608, the set of shared cache units 606, and the system agent unit 610/integrated memory controller unit(s) 614, alternative embodiments may use any number of well-known techniques for interconnecting such units. In one embodiment, coherency is maintained between one or more cache units 606 and cores 602-A-N.

In some embodiments, one or more of the cores 602A-N are capable of multi-threading. The system agent 610 includes those components coordinating and operating cores 602A-N. The system agent unit 610 may include for example a power control unit (PCU) and a display unit. The PCU may be or include logic and components needed for regulating the power state of the cores 602A-N and the integrated graphics logic 608. The display unit is for driving one or more externally connected displays.

The cores 602A-N may be homogenous or heterogeneous in terms of architecture instruction set; that is, two or more of the cores 602A-N may be capable of execution the same instruction set, while others may be capable of executing only a subset of that instruction set or a different instruction set.

Exemplary Computer Architectures

FIGS. 7-10 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 7:
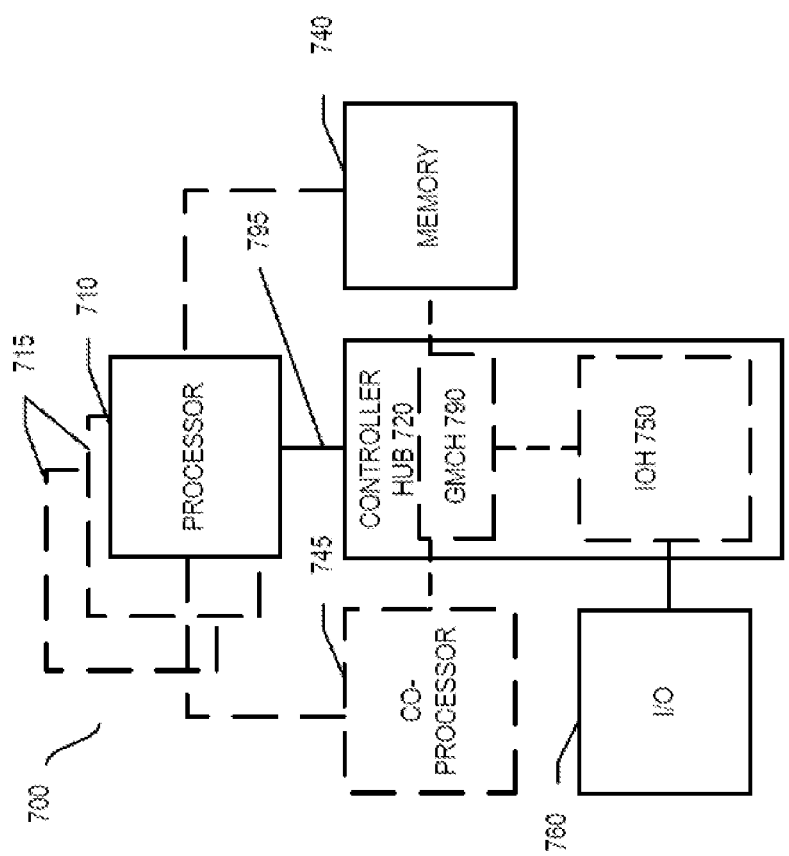
FIG. 7 illustrates a block diagram of a system in accordance with one embodiment of the present invention.

Referring now to FIG. 7, shown is a block diagram of a system 700 in accordance with one embodiment of the present invention. The system 700 may include one or more processors 710, 715, which are coupled to a controller hub 720. In one embodiment, the controller hub 720 includes a graphics memory controller hub (GMCH) 790 and an Input/Output Hub (IOH) 750 (which may be on separate chips); the GMCH 790 includes memory and graphics controllers to which are coupled memory 740 and a coprocessor 745; the IOH 750 is couples input/output (I/O) devices 760 to the GMCH 790. Alternatively, one or both of the memory and graphics controllers are integrated within the processor (as described herein), the memory 740 and the coprocessor 745 are coupled directly to the processor 710, and the controller hub 720 in a single chip with the IOH 750.

The optional nature of additional processors 715 is denoted in FIG. 7 with broken lines. Each processor 710, 715 may include one or more of the processing cores described herein and may be some version of the processor 600.

The memory 740 may be, for example, dynamic random access memory (DRAM), phase change memory (PCM), or a combination of the two. For at least one embodiment, the controller hub 720 communicates with the processor(s) 710, 715 via a multi-drop bus, such as a frontside bus (FSB), point-to-point interface, or similar connection 795.

In one embodiment, the coprocessor 745 is a special-purpose processor, such as, for example, a high-throughput MIC processor, a network or communication processor, compression engine, graphics processor, GPGPU, embedded processor, or the like. In one embodiment, controller hub 720 may include an integrated graphics accelerator.

There can be a variety of differences between the physical resources 710, 7155 in terms of a spectrum of metrics of merit including architectural, microarchitectural, thermal, power consumption characteristics, and the like.

In one embodiment, the processor 710 executes instructions that control data processing operations of a general type. Embedded within the instructions may be coprocessor instructions. The processor 710 recognizes these coprocessor instructions as being of a type that should be executed by the attached coprocessor 745. Accordingly, the processor 710 issues these coprocessor instructions (or control signals representing coprocessor instructions) on a coprocessor bus or other interconnect, to coprocessor 745. Coprocessor(s) 745 accept and execute the received coprocessor instructions.

Figure 8:
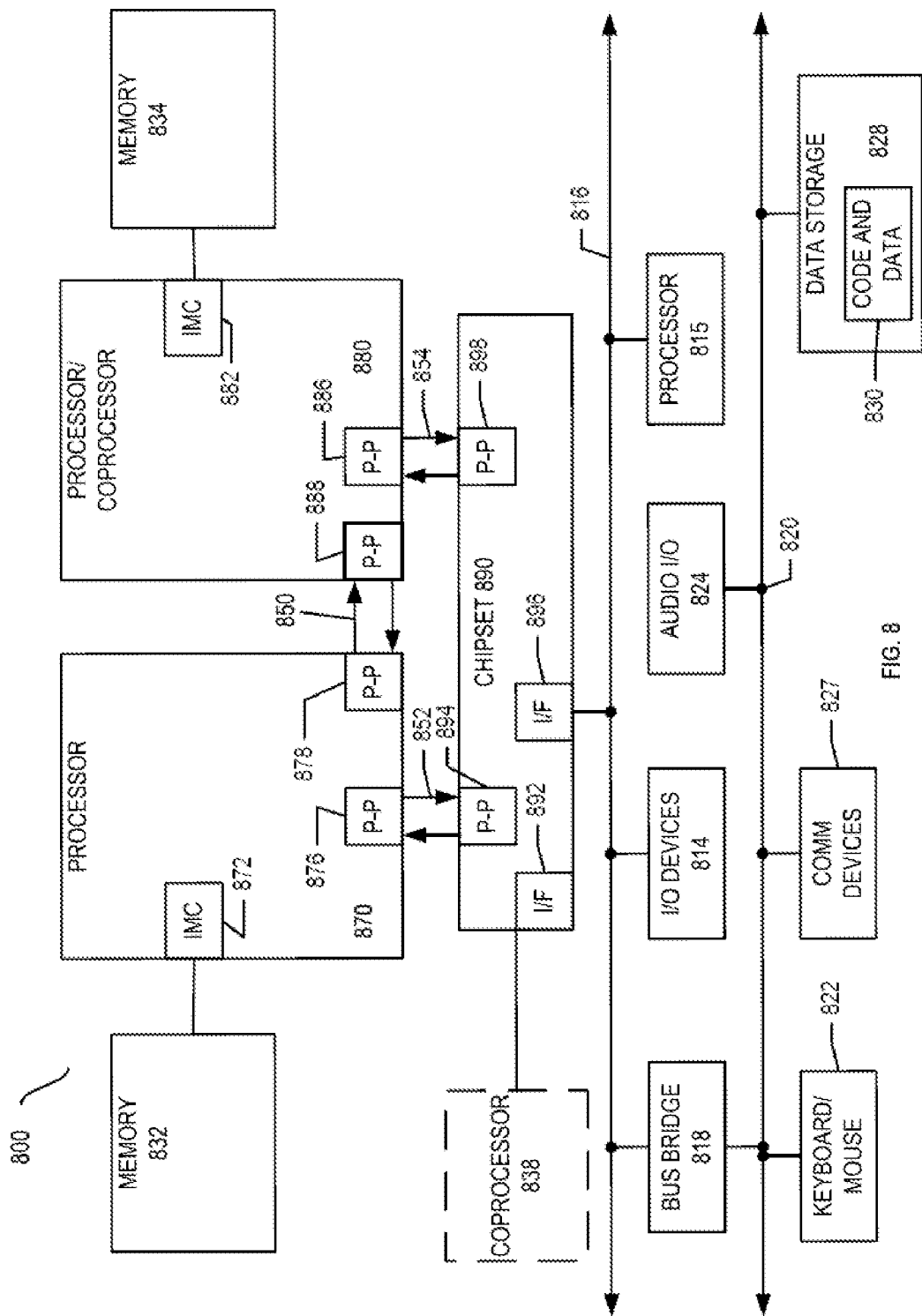
FIG. 8 illustrates a block diagram of a second system in accordance with an embodiment of the present invention.

Referring now to FIG. 8, shown is a block diagram of a first more specific exemplary system 800 in accordance with an embodiment of the present invention. As shown in FIG. 8, multiprocessor system 800 is a point-to-point interconnect system, and includes a first processor 870 and a second processor 880 coupled via a point-to-point interconnect 850. Each of processors 870 and 880 may be some version of the processor 600. In one embodiment of the invention, processors 870 and 880 are respectively processors 710 and 715, while coprocessor 838 is coprocessor 745. In another embodiment, processors 870 and 880 are respectively processor 710 coprocessor 745.

Processors 870 and 880 are shown including integrated memory controller (IMC) units 872 and 882, respectively. Processor 870 also includes as part of its bus controller units point-to-point (P-P) interfaces 876 and 878; similarly, second processor 880 includes P-P interfaces 886 and 888. Processors 870, 880 may exchange information via a point-to-point (P-P) interface 850 using P-P interface circuits 878, 888. As shown in FIG. 8, IMCs 872 and 882 couple the processors to respective memories, namely a memory 832 and a memory 834, which may be portions of main memory locally attached to the respective processors.

Processors 870, 880 may each exchange information with a chipset 890 via individual P-P interfaces 852, 854 using point to point interface circuits 876, 894, 886, 898. Chipset 890 may optionally exchange information with the coprocessor 838 via a high-performance interface 892. In one embodiment, the coprocessor 838 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another I/O interconnect bus, although the scope of the present invention is not so limited.

As shown in FIG. 8, various I/O devices 814 may be coupled to first bus 816, along with a bus bridge 818 which couples first bus 816 to a second bus 820. In one embodiment, one or more additional processor(s) 815, such as coprocessors, high-throughput MIC processors, GPGPU's, accelerators (such as, e.g., graphics accelerators or digital signal processing (DSP) units), field programmable gate arrays, or any other processor, are coupled to first bus 816. In one embodiment, second bus 820 may be a low pin count (LPC) bus. Various devices may be coupled to a second bus 820 including, for example, a keyboard and/or mouse 822, communication devices 827 and a storage unit 828 such as a disk drive or other mass storage device which may include instructions/code and data 830, in one embodiment. Further, an audio I/O 824 may be coupled to the second bus 816. Note that other architectures are possible. For example, instead of the point-to-point architecture of FIG. 8, a system may implement a multi-drop bus or other such architecture.

Figure 9:
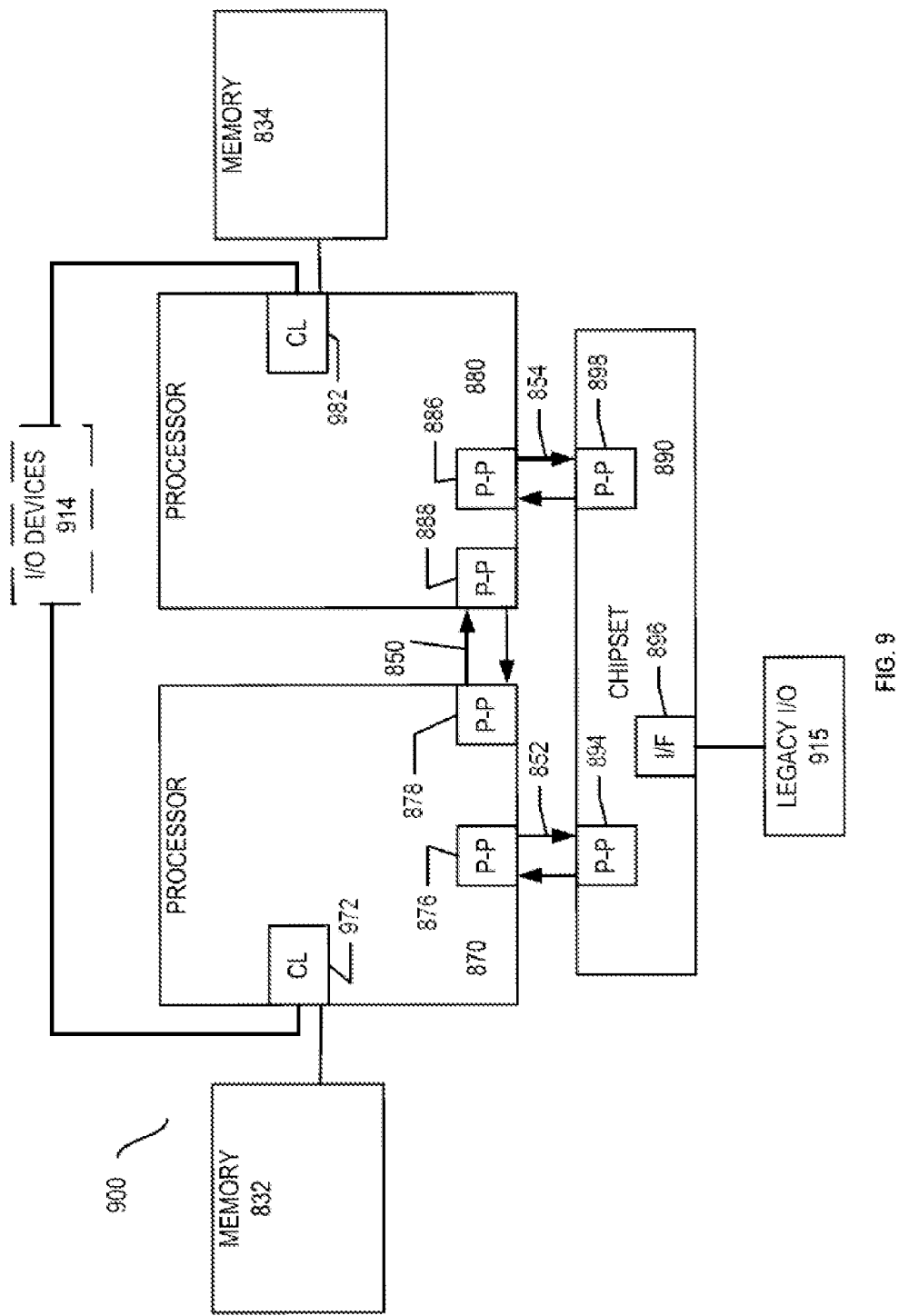
FIG. 9 illustrates a block diagram of a third system in accordance with an embodiment of the present invention.

Referring now to FIG. 9, shown is a block diagram of a second more specific exemplary system 900 in accordance with an embodiment of the present invention. Like elements in FIGS. 8 and 9 bear like reference numerals, and certain aspects of FIG. 8 have been omitted from FIG. 9 in order to avoid obscuring other aspects of FIG. 9.

FIG. 9 illustrates that the processors 870, 880 may include integrated memory and I/O control logic ("CL") 972 and 982, respectively. Thus, the CL 972, 982 include integrated memory controller units and include I/O control logic. FIG. 9 illustrates that not only are the memories 832, 834 coupled to the CL 872, 882, but also that I/O devices 914 are also coupled to the control logic 872, 882. Legacy I/O devices 915 are coupled to the chipset 890.

Figure 10:
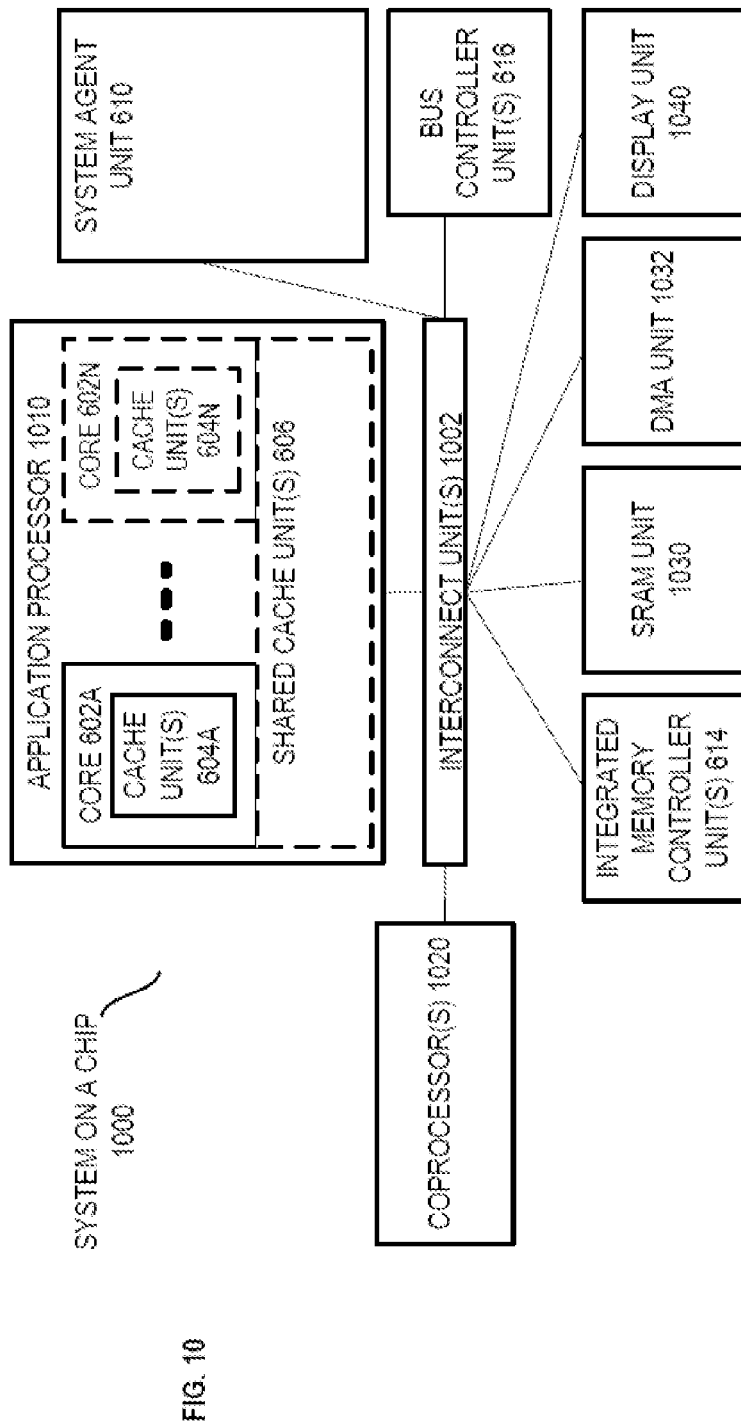
FIG. 10 illustrates a block diagram of a system on a chip (SoC) in accordance with an embodiment of the present invention.

Referring now to FIG. 10, shown is a block diagram of a SoC 1000 in accordance with an embodiment of the present invention. Similar elements in FIG. 6 bear like reference numerals. Also, dashed lined boxes are optional features on more advanced SoCs. In FIG. 10, an interconnect unit(s) 1002 is coupled to: an application processor 1010 which includes a set of one or more cores 102A-N, cache units 604A-N, and shared cache unit(s) 606; a system agent unit 610; a bus controller unit(s) 616; an integrated memory controller unit(s) 614; a set or one or more coprocessors 1020 which may include integrated graphics logic, an image processor, an audio processor, and a video processor; an static random access memory (SRAM) unit 1030; a direct memory access (DMA) unit 1032; and a display unit 1040 for coupling to one or more external displays. In one embodiment, the coprocessor(s) 1020 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 830 illustrated in FIG. 8, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 11:
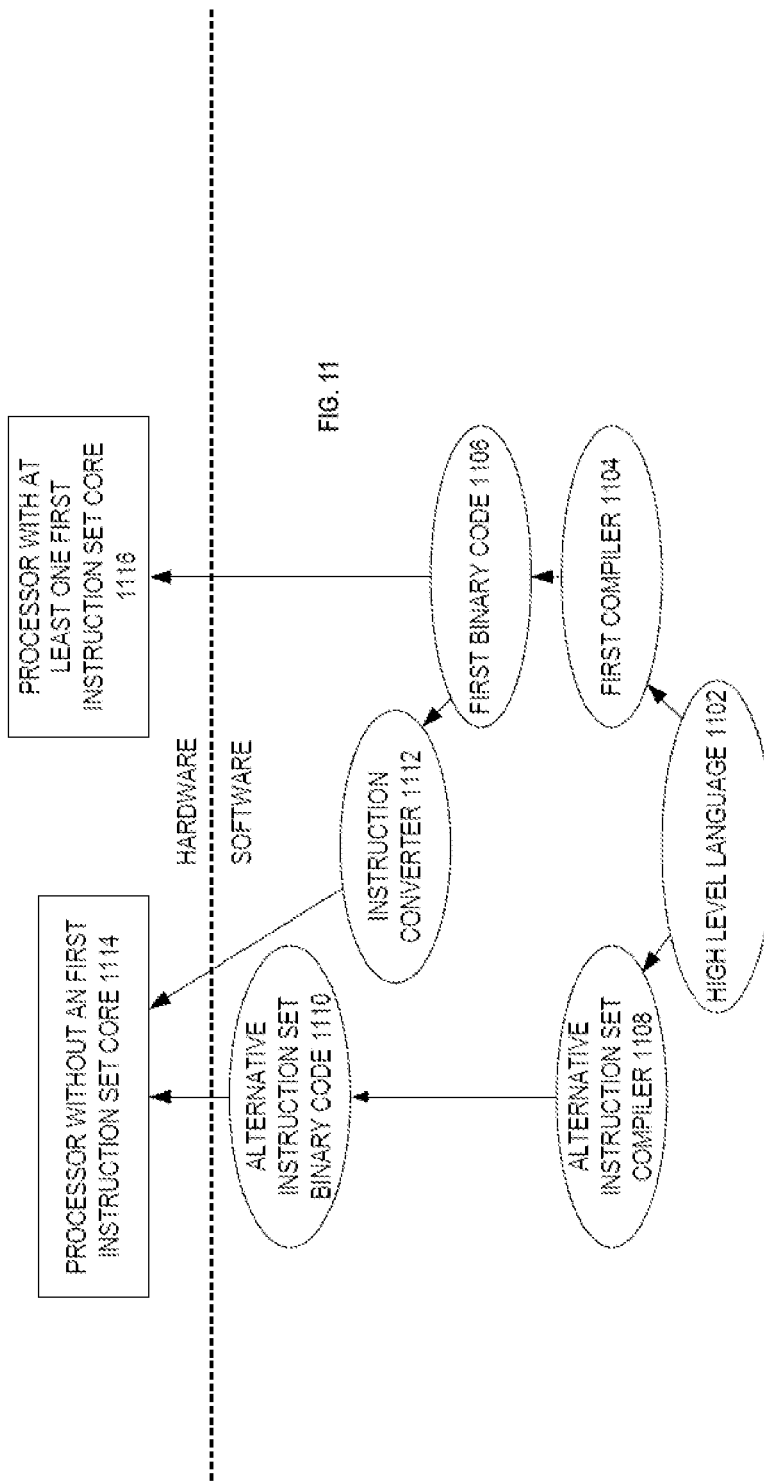
FIG. 11 illustrates a block diagram contrasting the use of a software instruction converter to convert binary instructions in a source instruction set to binary instructions in a target instruction set according to embodiments of the invention.

FIG. 11 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 11 shows a program in a high level language 1102 may be compiled using an first compiler 1104 to generate a first binary code (e.g., x86) 1106 that may be natively executed by a processor with at least one first instruction set core 1116. In some embodiments, the processor with at least one first instruction set core 1116 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The first compiler 1104 represents a compiler that is operable to generate binary code of the first instruction set 1106 (e.g., object code) that can, with or without additional linkage processing, be executed on the processor with at least one first instruction set core 1116. Similarly, FIG. 11 shows the program in the high level language 1102 may be compiled using an alternative instruction set compiler 1108 to generate alternative instruction set binary code 1110 that may be natively executed by a processor without at least one first instruction set core 1114 (e.g., a processor with cores that execute the MIPS instruction set of MIPS Technologies of Sunnyvale, California and/or that execute the ARM instruction set of ARM Holdings of Sunnyvale, California). The instruction converter 1112 is used to convert the first binary code 1106 into code that may be natively executed by the processor without an first instruction set core 1114. This converted code is not likely to be the same as the alternative instruction set binary code 1110 because an instruction converter capable of this is difficult to make; however, the converted code will accomplish the general operation and be made up of instructions from the alternative instruction set. Thus, the instruction converter 1112 represents software, firmware, hardware, or a combination thereof that, through emulation, simulation or any other process, allows a processor or other electronic device that does not have a first instruction set processor or core to execute the first binary code 1106.

Thread Scheduling Based on Processor Information

Figure 12:
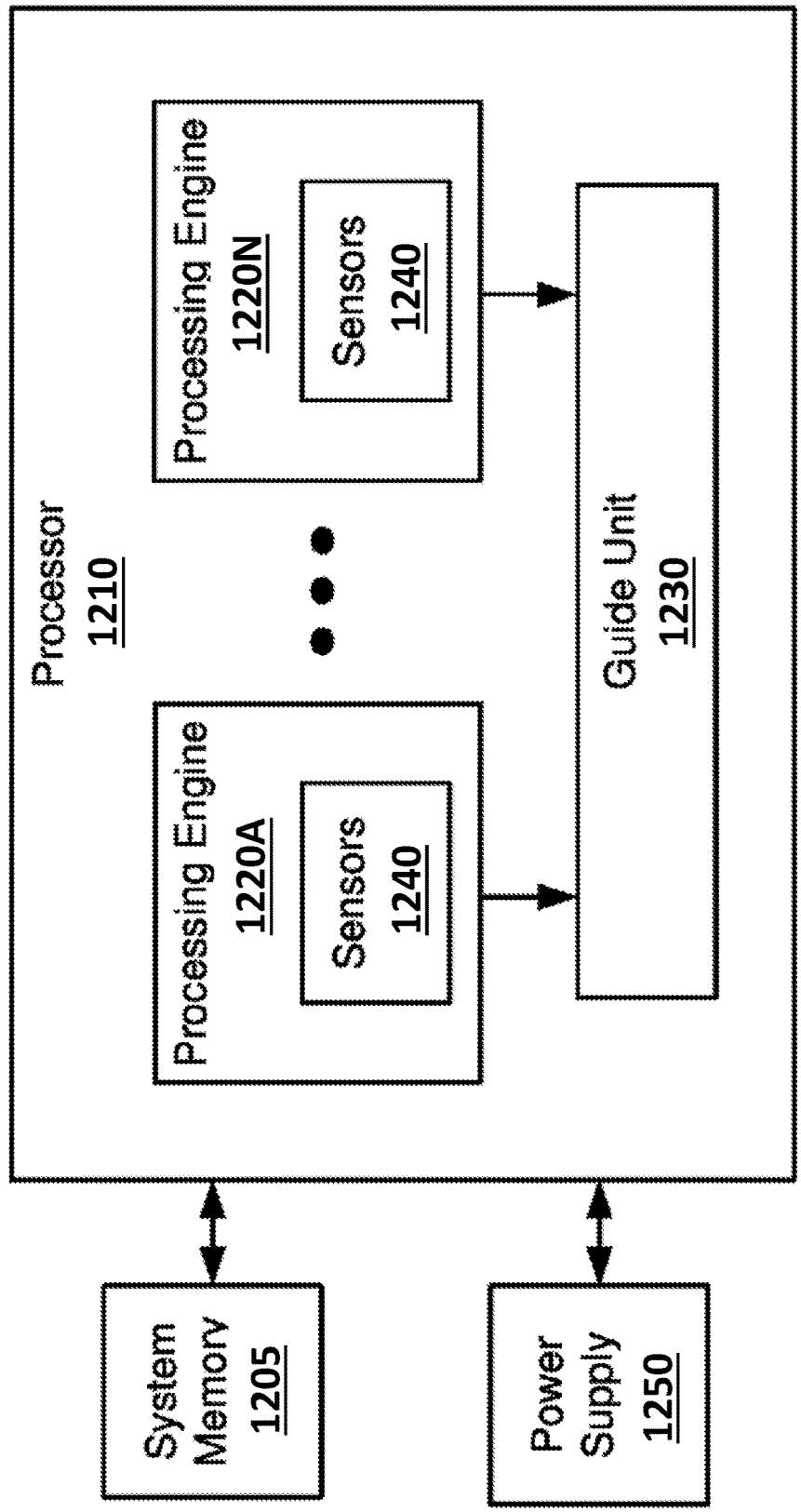
FIG. 12 illustrates one embodiment comprising a hardware guide unit.

Referring now to FIG. 12, shown is a block diagram of a system 1200 in accordance with one or more embodiments. In some embodiments, the system 1200 may be all or a portion of an electronic device or component. For example, the system 1200 may be a cellular telephone, a computer, a server, a network device, a system on a chip (SoC), a controller, a wireless transceiver, a power supply unit, etc. Furthermore, in some embodiments, the system 1200 may be part of a grouping of related or interconnected devices, such as a datacenter, a computing cluster, etc.

As shown in FIG. 12, the system 1200 may include a processor 1210 operatively coupled to system memory 1205 and a power supply 1250. Further, although not shown in FIG. 12, the system 1200 may include other components. In one or more embodiments, the system memory 1205 can be implemented with any type(s) of computer memory (e.g., dynamic random-access memory (DRAM), static random-access memory (SRAM), non-volatile memory (NVM), a combination of DRAM and NVM, etc.). The power supply 1250 may provide electrical power to the processor 1210.

In one or more embodiments, the processor 1210 may be a hardware processing device (e.g., a central processing unit (CPU), a System on a Chip (SoC), and so forth). As shown, the processor 1210 can include any number of processing engines 1220A-1220N (also referred to generally as processing engines 1220) and a guide unit 1230. Each processing engine 1220 can include one or more sensors 1240 to provide measurements regarding the processing engine 1220 to the guide unit 1230. For example, the sensors 1240 may provide measurements regarding processing engine performance, efficiency, power usage, temperature, reliability, thread execution, and so forth.

In one or more embodiments, the guide unit 1230 may be a hardware component of the processor 1210 to provide processing engine information to guide a thread scheduler (not shown). In some embodiments, the processing engine information may include one or more rankings of processing engines (e.g., thread agnostic rankings, thread specific rankings, and so forth). Further, in some embodiments, the processing engine information may include one or more predicted characteristics of a processing engine. Various aspects of the guide unit 1230 are described below with reference to FIGS. 13A-17.

Figure 13A:
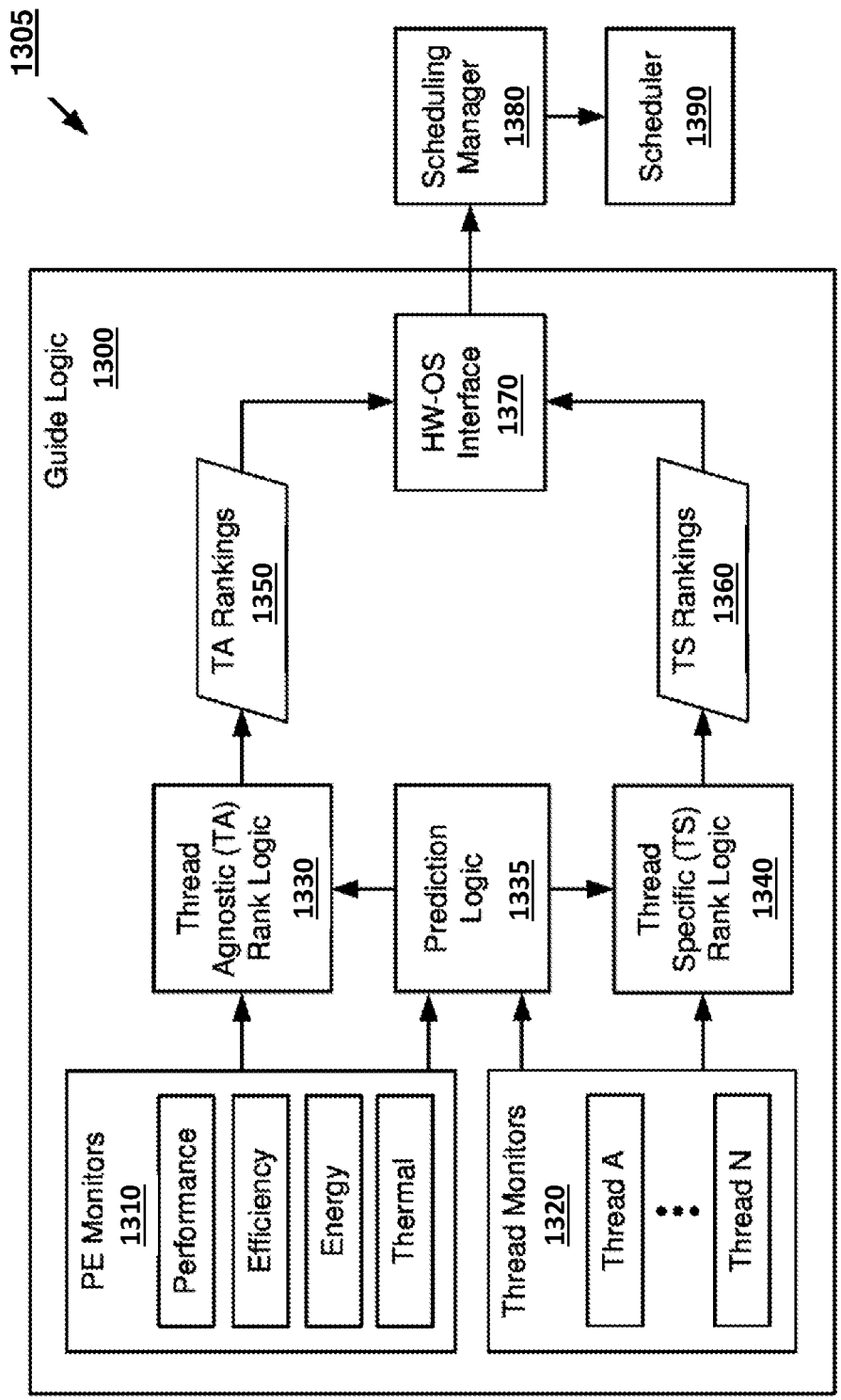
FIGS. 13A-C illustrate details for one embodiment of a guide circuit/logic.

Referring to FIG. 13A, shown is a diagram of an example system 1305, in accordance with one or more embodiments. The system 1305 may include guide logic 1300, a scheduling manager 1380, and a scheduler 1385. The guide logic 1300 may correspond generally to some or all of the guide unit 1230 (shown in FIG. 12). In some embodiments, the guide logic 1300 may be implemented at least in part using hardware.

As shown in FIG. 13A, the guide logic 1300 may include processing engine (PE) monitors 1310, thread monitors 1320, thread agnostic (TA) rank logic 1330, prediction logic 1335, thread specific (TS) rank logic 1340, and a hardware-operating system (HW-OS) interface 1370. As used herein, "thread agnostic rank" refers to a rank that is independent from any particular thread or workload type. For example, some workload types may include compute-intensive (e.g., PE resources required), memory-intensive (e.g., memory controller bandwidth required), highly-parallelized (e.g., graphics processing resources required), accelerated (e.g., accelerator resources required), and so forth. In some embodiments, a single thread may be characterized as one or more workload types depending the instructions included in an instruction sequence.

In one or more embodiments, the PE monitors 1310 may monitor characteristics of each PE without regard to a specific workload or thread. The monitored characteristics of each PE may include performance, efficiency, energy use, thermal, and reliability characteristics. For example, the PE monitors 1310 may monitor metrics such as instructions per clock cycle, power consumed per time period, percentage of maximum performance, average power state, temperature, percentage of lifecycle that has elapsed, total number of power cycles, maximum power level, and so forth. The PE monitors 1310 may be implemented using hardware counters.

In some embodiments, the PE monitors 1310 may monitor and/or count system events representing PE execution characteristics (e.g., microarchitecture events, architecture events, system events, etc.). For example, the PE monitors 1310 may determine the number of floating point instruction retired, the number of memory instructions retired, the number of branch mispredictions, the number of cache misses, the number of pipeline stalls, and so forth.

In one or more embodiments, the thread monitors 1320 may monitor characteristics of individual threads. For example, the thread monitors 1320 may monitor metrics such as instructions completed per time period, idle time, and so forth. Further, the thread monitors 1320 may determine an execution profile and/or type, such as graphics processing, network processing, floating point calculation, encryption processing, and so forth. The thread monitors 1320 may be implemented using hardware counters.

In some embodiments, the prediction logic 1335 may use data from the PE monitors 1310 and/or the thread monitors 1320 to predict the performance of a thread on multiple PEs. For example, assume that a first thread is currently executing on a first PE (e.g., PE 1220A shown in FIG. 12) of a processor having multiple PEs. In some embodiments, the prediction logic 1335 may analyze characteristics of the first thread, the first PE, and other PEs (e.g., PE 1220N shown in FIG. 12) to predict characteristics of the first thread if it were to instead be executed on the other PEs (e.g., if the first thread were moved to a second PE). The predictions performed by the prediction logic 1335 are described further below with reference to FIGS. 15 and 17.

Figure 13B:
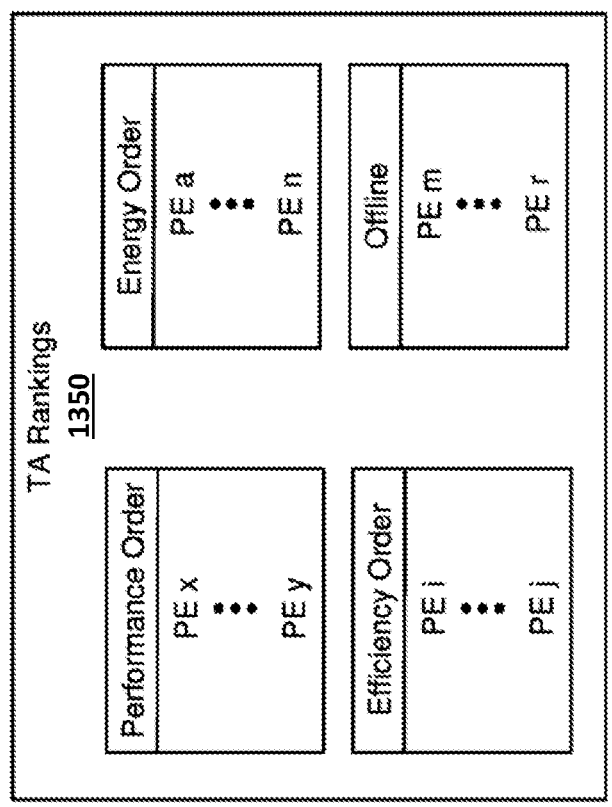

In one or more embodiments, the TA rank logic 1330 may use data from the PE monitors 1310 and/or the prediction logic 1335 to generate one or more TA rankings 1350. In some embodiments, each TA ranking 1350 may include a list of PEs arranged in a particular thread agnostic order. Referring now to FIG. 13B, shown is an example set of TA rankings 1350, in accordance with some embodiments. Specifically, as shown in FIG. 13B, the TA rankings 1350 may include a performance order ranking, an efficiency order ranking, an energy order ranking, and an offline order ranking. In some embodiments, the performance order ranking may reflect the relative performance capabilities of the PEs (e.g., from fast processing to slowest processing). The efficiency order ranking may reflect the relative energy efficiency capabilities of the PEs (e.g., from most efficient to least efficient). The energy order ranking may reflect the relative power consumption of the PEs. The offline order ranking may indicate which PEs are to be taken offline, and/or a sequential order of the PEs in which they should be taken offline if necessary. In some embodiments, the TA rankings 1350 may be stored in a global processor location or structure. For example, the TA rankings 1350 may be stored in registers of a processor (e.g., processor 1210 shown in FIG. 12), in external memory (e.g., system memory 1205 shown in FIG. 12), and so forth.

Referring again to FIG. 13A, the TS rank logic 1340 may use data from the thread monitors 1320 and/or the prediction logic 1335 to generate one or more TS rankings 1360. In some embodiments, each TS ranking 1360 may be associated with a particular thread, and may include a list of PEs arranged in an order specific to that particular thread.

Figure 13C:
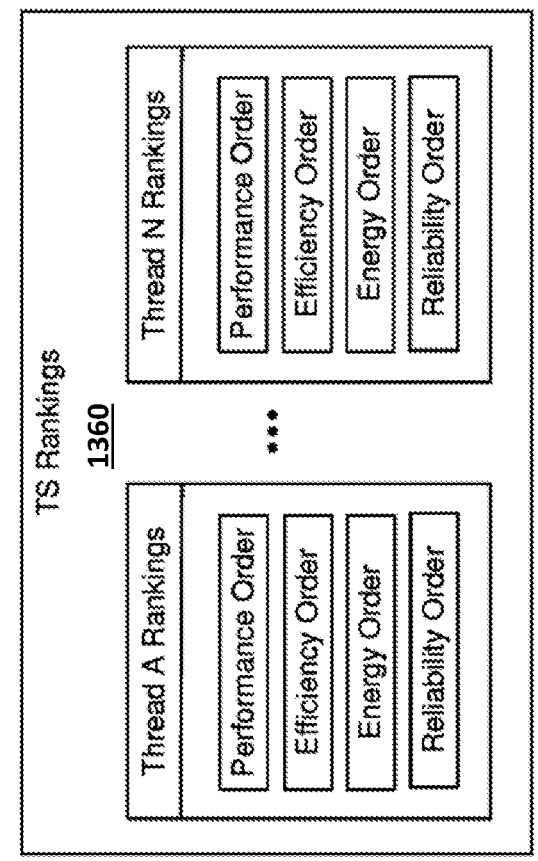

Referring now to FIG. 13C, shown is an example set of TS rankings 1360, in accordance with some embodiments. For example, the TS rankings 1360 may a PE ranking for thread A, a PE ranking for thread B, and so forth. In some embodiments, the TS rankings 1360 may be stored in global processor memory structure. For example, the TA rankings 1350 may be stored in registers of a processor, in external memory, in a thread context block maintained by the OS, and so forth. In some embodiments, the TS rankings 1360 may be generated and/or updated in response to process context switch events.

Referring again to FIG. 13A, in some embodiments, the TA rankings 1350 and the TS rankings 1360 may be provided to the scheduling manager 1380 via the HW-OS interface 1370. In some embodiments, the HW-OS interface 1370 may include registers and/or memory structures defined at the PE and/or thread level. Further, the HW-OS interface 1370 may include enumeration registers and capabilities that allow the OS to discover and/or identify specific support and definition of PE information provided by the guide logic 1300. The HW-OS interface 1370 may also support interrupt capabilities to alert the OS about status and/or events of the guide logic 1300.

In one or more embodiments, the scheduling manager 1380 and/or the scheduler 1385 may implemented in software (e.g., the operating system, a stand-alone application, etc.). The scheduling manager 1380 may control the amount and/or format of the TA rankings 1350 and TS rankings 1360 provided to the scheduler 1385. For example, the scheduling manager 1380 may sort PE rankings, may filter PE rankings according to criteria (e.g., by age, by PE group, by thread group, by type, and so forth), may combine multiple PE rankings to generate combined PE rankings, may reformat PE rankings, and so forth.

In one or more embodiments, the scheduler 1385 may use the TA rankings 1350 and/or the TS rankings 1360 to allocate threads to PEs (e.g., PEs 1220 shown in FIG. 12). For example, the scheduler 1385 may use PE information to schedule threads based on a current system priority, policy, or state (e.g., a specified balance between performance, efficiency, power consumption, and/or reliability priorities), based on thread specific characteristics (e.g., whether a thread is defined as a foreground task or a background task), to control temperature gradients and/or hot spots in PEs, and so forth.

In some embodiments, the TA rankings 1350 and/or the TS rankings 1360 may include indications to provide specific guidance to the scheduler 1385. For example, a first PE may be assigned a rank value (e.g., "0") to indicate that the first PE is to remain offline and thus should not be assigned any threads. In some embodiments, a PE may be taken offline to improve reliability of the PE, to delay a lifecycle limit of the PE, to remain within a specified power budget, to limit power use during a particular power state, to control temperature gradients and/or hot spots in PEs, and so forth.

In some embodiments, the output of the guide logic 1300 may reflect groupings of PEs according to defined criteria. For example, the PEs listed in the TA rankings 1350 may be grouped into performance classes (e.g., Class A with performance metric from 0 to 2, Class B with performance metric from 3 to 7, and Class C with performance metric from 8 to 10). Such groupings may allow the scheduler 1385 to manage thread allocations by groups rather than by individual PEs.

Figure 14B:
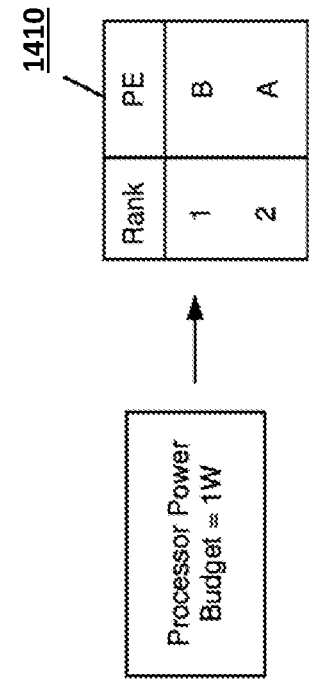
FIGS. 14A-B illustrate different processor power budgets.
Figure 14A:
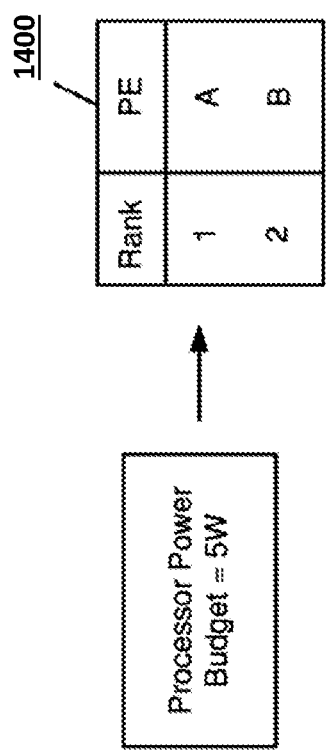

Referring now to FIGS. 14A-14B, shown are examples rankings that are updated based on changing PE information, in accordance with one or more embodiments. Specifically, FIG. 14A shows an example corresponding to a processor that includes two PEs (i.e., PE A and PE B). Assume that the processor has a full power budget (e.g., 5 W), and that PE A has higher performance than PE B when receiving the full power budget. Accordingly, as shown in FIG. 14A, a first performance ranking 1400 indicates that PE A is ranked higher than PE B.

Turning now to FIG. 14B, assume that the power budget is reduced to a low power level (e.g., 1 W) at a later point in time. Assume further that PE B has higher performance than PE A when receiving this low power level. For example, PE B may be optimized to operate at a low clock speed. Accordingly, as shown in FIG. 14B, the second performance ranking 1410 indicates that PE B is ranked higher than PE A. In this manner, the ranking information received by a scheduler may be updated to reflect changing conditions affecting the processing engines.

Figure 15A:
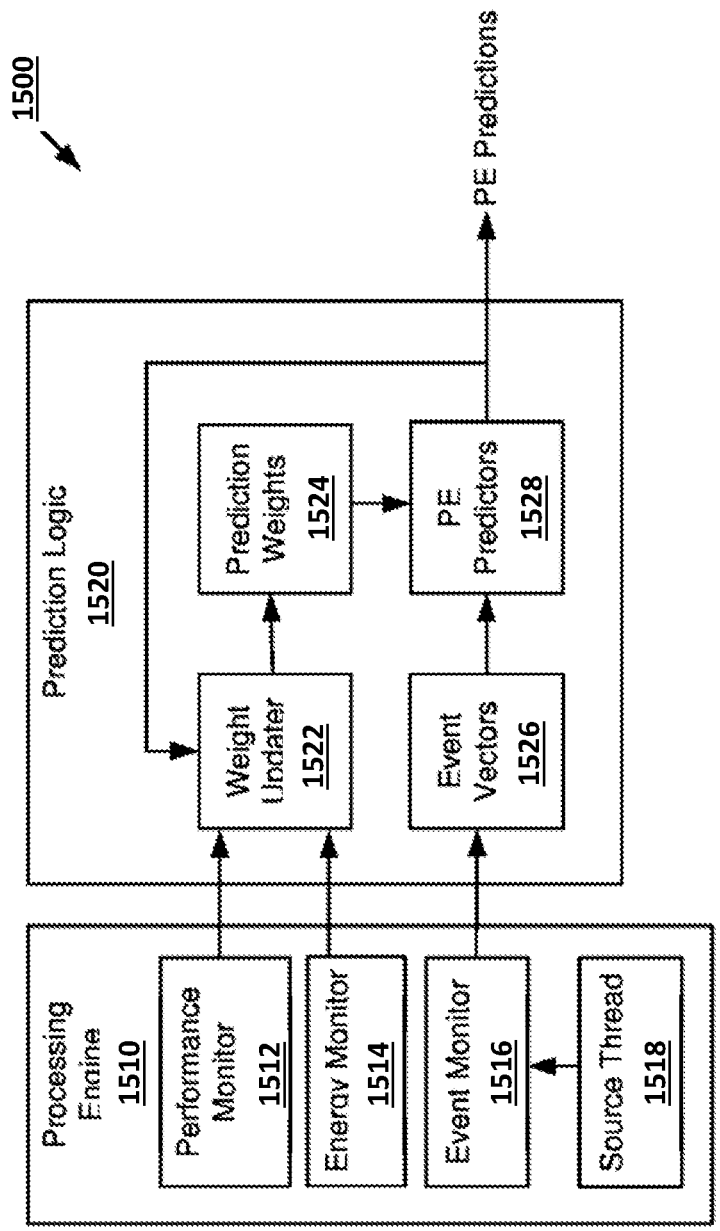
FIGS. 15A-C illustrate one embodiment of a prediction circuit/logic using event vectors and prediction weights.

Referring now to FIG. 15A, shown is a diagram of an example system 1500 in accordance with one or more embodiments. As shown, the system 1500 may include a processing engine (PE) 1510 and prediction logic 1520. The prediction logic 1520 may correspond generally to some or all of the prediction logic 1335 shown in FIG. 13A.

In some embodiments, the PE 1510 may include a performance monitor 1512, an energy monitor 1514, and an event monitor 1516. Further, the PE 1510 may execute a source thread 1518. The event monitor 1516 may detect events of the PE 1510 during execution of the source thread 1518, such as memory instruction retirements, floating point instruction retirements, branch mispredictions, cache misses, pipeline stalls, and so forth. The performance monitor 1512 may monitor performance characteristics of the PE 1510 (e.g., instructions per clock cycle, percentage of maximum performance, etc.). The energy monitor 1514 may monitor energy characteristics of the PE 1510, such as power consumed per time period, power state, etc. In some embodiments, the performance monitor 1512, the energy monitor 1514, and/or the event monitor 1516 may be implemented using hardware counters.

In one or more embodiments, the prediction logic 1520 may include a weight updater 1522, prediction weights 1524, event vectors 1526, and PE predictors 1514. In some embodiments, the prediction logic 1520 may receive indications of events from the event monitor 1516 of PE 1510, and may populate the event vectors 1526 according to the received indications.

Figure 15C:
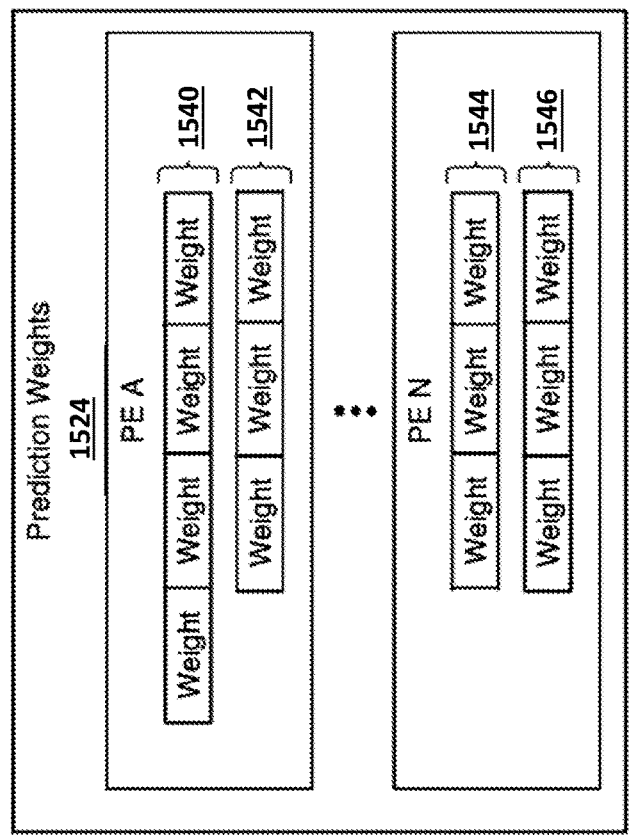
Figure 15B:
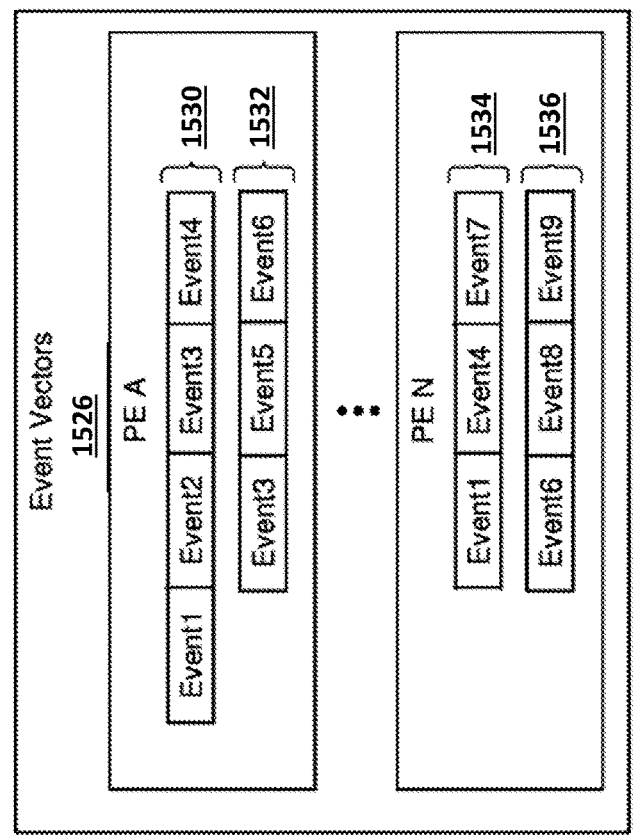

Referring now to FIG. 15B, shown is an example set of event vectors 1526, in accordance with some embodiments. As shown, the event vectors 1526 may include groups of vectors associated with various PEs (i.e., PE A to PE N). In some embodiments, each event vector 1526 may include a unique number of fields, with each field being associated with a unique type of event. For example, a group of vectors for PE A may include a performance vector 1530 and an energy vector 1532. The performance vector 1530 may include four fields, with each field indicating the occurrence of a particular event type. For example, a performance vector 1530 may include a first field to store a number of memory instruction retirements, a second field to store a number of floating point instruction retirements, and so forth. The energy vector 1532 may include three fields, with each field indicating the occurrence of a particular event type.

It is contemplated that the event vectors 1526 for different PEs (or different PE types) may include fields for different event types, and may include different numbers of fields. For example, the group of vectors for PE N may include a performance vector 1534 with three fields, and an energy vector 1536 with three fields.

In some embodiments, the prediction weights 1524 (shown in FIG. 15A) may be arranged in vectors similar to the event vectors 1526. Referring now to FIG. 15C, shown is an example set of prediction weights 1524 in accordance with some embodiments. As shown, the prediction weights 1524 may include weight vectors 1540, 1542 for PE A. The weight vector 1540 may include four weight fields that correspond to the performance vector 1530. The weight vector 1542 may include three weight fields that correspond to the energy vector 1532 of PE A. Further, the weight vectors 1544, 1546 may correspond respectively to the performance vector 1534 and energy vector 1536 for PE B.

Referring again to FIG. 15A, the PE predictors 1528 may generate PE predictions for executing the source thread 1518 on other PEs. Specifically, the PE predictors 1528 may use events in the processing engine 1510 (as populated in the event vectors 1526) and the prediction weights 1524 to predict characteristics of source thread 1518 if executed on different PEs (i.e., on PEs other than PE 1510). For example, the PE predictors 1528 may provide performance predictions, power usage predictions, clock frequency predictions, and so forth. The PE predictors 1528 may include linear predictors (e.g., linear regression), non-linear predictors, reinforcement logic models, and so forth.

In one or more embodiment, the PE predictors 1528 may use a linear predictor to multiply an event vector 1526 by a weight vector of the prediction weights 1524, and determine a predicted value based on a sum of the element products. For example, the linear predictor may multiply each element of performance vector 1530 of PE A (shown in FIG. 15B) by the corresponding element of weight vector 1540 of PE A (shown in FIG. 15C), and may sum the products of all vector elements. The resulting sum may be a predicted performance value for the source thread 1518 if it was executed on PE A. In some embodiments, the predicted performance may be provided to a scheduler (e.g., scheduler 1385 shown in FIG. 13A), and the scheduler may use this information to determine whether to move the source thread 1518 to PEA from PE 1510.

In one or more embodiment, the PE predictors 1528 may provide predictions as to use a linear predictor to multiply an event vector 1526 by a weight vector of the prediction weights 1524, and determine a predicted value based on a sum of the element products. For example, the linear predictor may multiply each element of performance vector 1530 of PE A (shown in FIG. 15B) by the corresponding element of weight vector 1540 of PE A (shown in FIG. 15C), and may sum the products of all vector elements. The resulting sum may be a predicted performance value for the source thread 1518 if it was executed on PE A. In some embodiments, the predicted performance may be provided to a scheduler (e.g., scheduler 1385 shown in FIG. 13A), and the scheduler may use this information to determine whether to move the source thread 1518 to PEA from PE 1510.

In one or more embodiment, the weight updater 1522 may compare PE predictions for a given PE to measured values to adjust the prediction weights 1524. For example, assume that a scheduler receives predicted performance and energy characteristics for PE A, and then reallocates the source thread 1518 to PE A. Assume further that PE A includes a performance monitor 1512 and an energy monitor 1514 that provide measured performance and energy characteristics for the execution of the source thread 1518 on PE A. In this example, the weight updater 1522 may compare the predicted and measured characteristics, and may adjust the prediction weights 1524 based on this comparison. In this manner, the weight updater 1522 may adjust the prediction weights 1524 over time to improve the accuracy of future predictions of the prediction logic 1520.

Apparatus and Method for Adaptively Scheduling Work on Heterogeneous Processing Resources As described above, heterogeneous processing systems include a mix of high power, high performance "big" cores and energy efficient "small" cores. Some of these heterogeneous architectures also integrate graphics processors, digital signal processors, and other forms of compute units on the same chip or package. The main challenge when working with heterogeneous processors is to optimally allocate software threads to cores or other processing resources for optimal performance and/or energy consumption.

By way of an overview, the embodiments of the invention address several challenges including assisting the OS to identify the most appropriate core or logical processor type, helping the OS to schedule the right software thread to the right core and set relative priorities between threads when there are more threads then high perf cores, and helping the OS to schedule the most appropriate software thread to the most appropriate core or logical processor type to implement the best energy and power savings.

When a new thread is to be executed, the embodiments described below identify the class associated with the thread (or the default class) and select the logical processor available within that class having the highest performance and/or best energy efficiency values. If the optimal logical processor is not available, one embodiment of the invention determines the next best logical processor and either schedules the new thread for execution on the next best performance or energy cores, or migrates a running thread from the optimal logical processor to make room for the new thread. In one embodiment, the decision to migrate or not migrate the running thread is based on a comparison of performance and/or energy values associated with the new thread and the running thread. In one implementation, it is up to the OS to choose the appropriate scheduling method per software thread, ether based on energy consumption (e.g., for low power environments) or best performance As used herein, a logical processor (LP) may comprise a processor core or a specified portion of a processor core (e.g., a hardware thread on the processor core). For example, a single threaded core may map directly to one logical processor whereas an SMT core may map to multiple logical processors. If the SMT core is capable of simultaneously executing N threads, for example, then N logical processors may be mapped to the SMT core (e.g., one for each simultaneous thread). In this example, N may be any value based on the capabilities of the SMT core (e.g., 2, 4, 8, etc). Other execution resources may be associated with a logical processor such as an allocated memory space and/or portion of a cache.

In some cases, the platform may include a mix of cores, some of which include SMT support and some of which do not. In some cases, the performance and energy results of a core that has SMT support may be better than results on a non-SMT core when running more than one software thread. In other cases, the non-SMT core may provide better performance/energy results. Thus, in one embodiment, the scheduling order is: (1) schedule first on the core with highest performance/energy; (2) second, scheduled on the core with the lower perf/energy capabilities; and (3) finally, schedule on the core with SMT support.

Figure 16A:
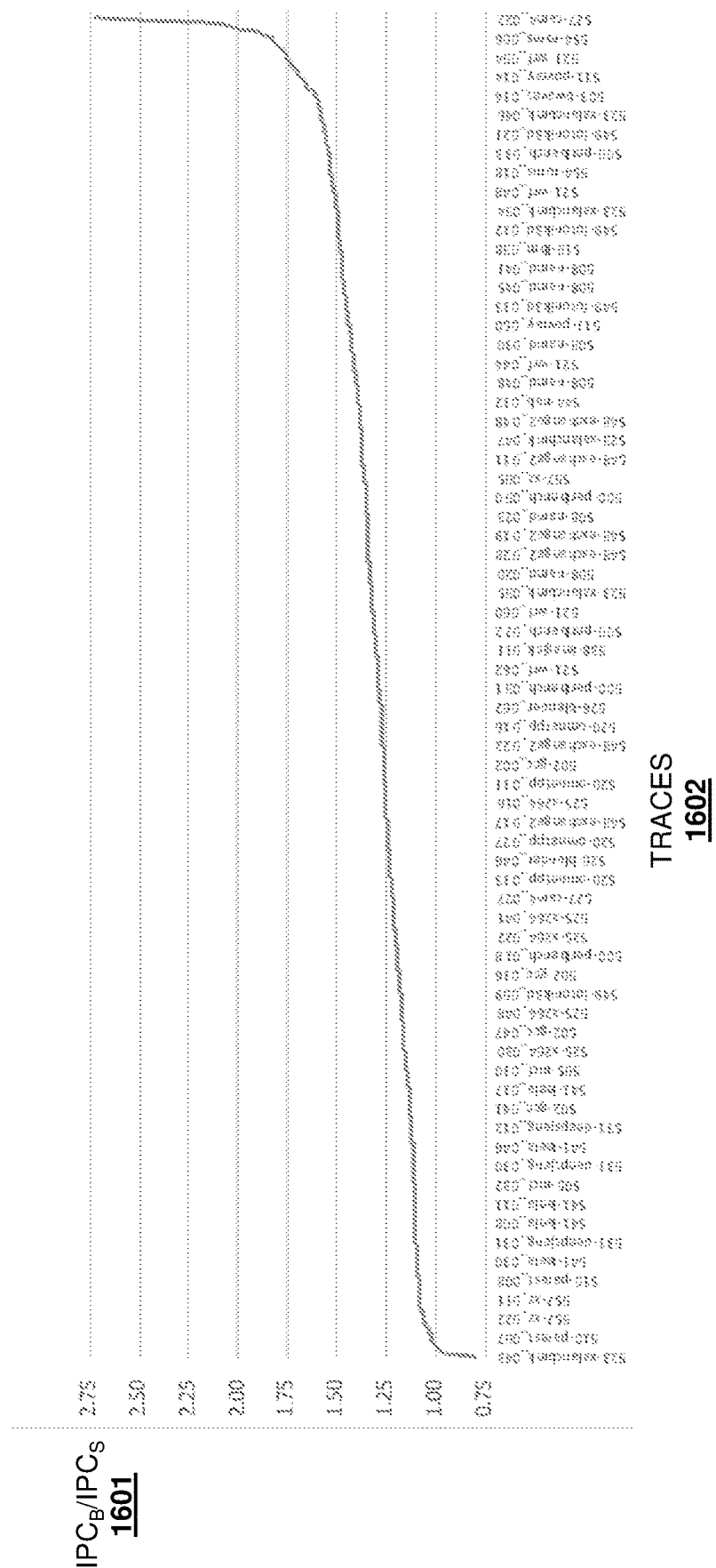
FIG. 16A-B illustrate different classes of instruction traces/workloads.

The graph in FIG. 16A shows a plurality of different workloads or traces 1602 and the resulting ratios of performance core instructions per clock ($IPC_{BIG}$ or $IPC_B$) over efficiency core instructions per clock ($IPC_{SMALL}$ or $IPC_S$). It can be seen from the data in FIG. 16A that random scheduling of threads from different types of workloads on a set of heterogeneous cores can result in lower performance than would be possible when compared with more intelligent allocation mechanisms.

Table A below shows the difference between random core selection and embodiments of the invention which allocate cores/processors as a function of the number of big cores and small cores/processors. Finding the optimal scheduler for different types of software threads can have a significant impact for asymmetric multi-threaded performance

TABLE A

| Config (B + S) | Average savings | Max savings |
|---|---|---|
| 2 + 8 | 5.5% | 17.6% |
| 2 + 16 | 4.5% | 10.9% |
| 2 + 32 | 2.6% | 7.1% |
| 4 + 8 | 6.3% | 16.2% |
| 4 + 16 | 5.9% | 13.3% |
| 4 + 32 | 4.2% | 10.2% |
| 8 + 8 | 6.0% | 14.7% |
| 8 + 16 | 6.6% | 12.3% |
| 8 + 32 | 5.8% | 11.8% |

In some embodiments described below, the "small cores" are Atom processors and the "big cores" are Core i3, i5, i7, or i9 cores. These cores may be integrated on the same die and/or interconnected on the same processor package. Note, however, that the underlying principles of the invention are not limited to any particular processor architecture or any specific type of processor or core.

At the same amount of power, a small core such as an Atom processor may provide higher performance than that of a big core. This power/performance cross point is a function of the ratio of big core IPC over small core IPC (i.e., $IPC_B/IPC_S$) which is particularly impacted for single threads or a small number of threads. The different $IPC_B/IPC_S$ values also impact the potential to reduce energy in order to improve battery life. As the ratio decreases, scheduling work on big cores becomes less attractive from an energy savings perspective.

Figure 16B:
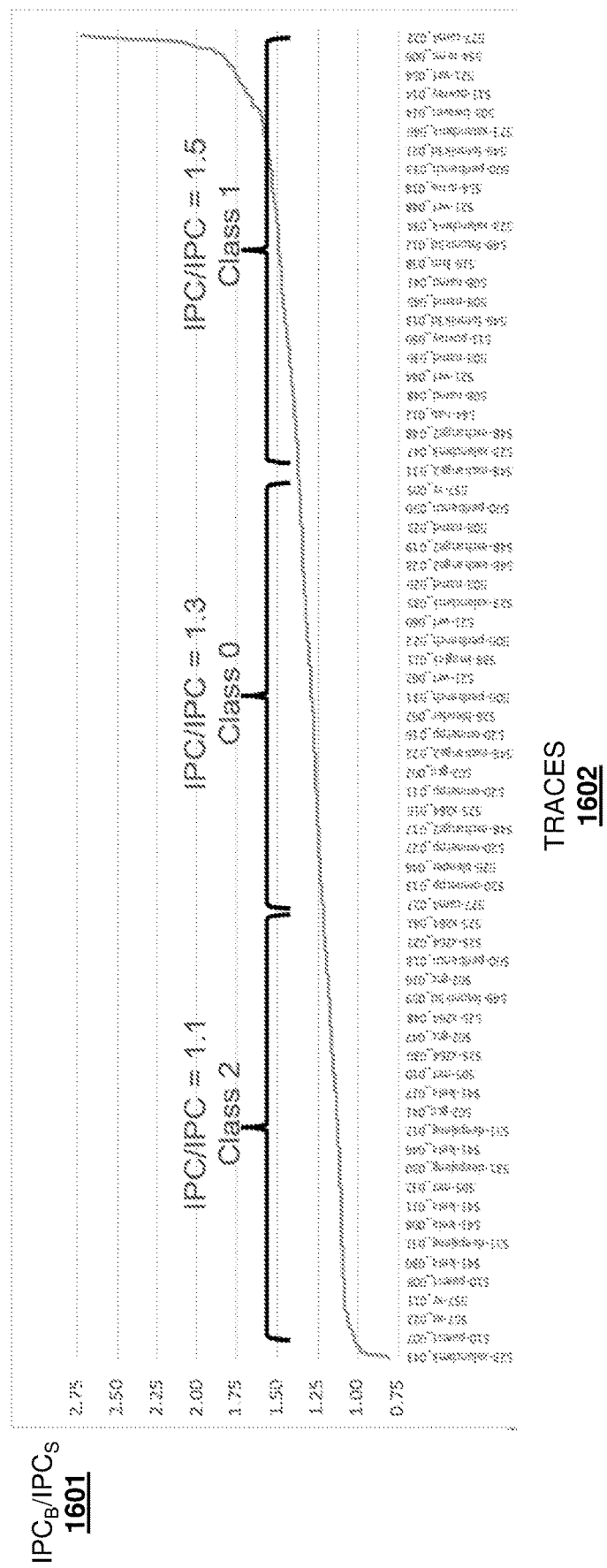

FIG. 16B highlights one embodiment in which different classes are defined for different types of workloads. In particular, this embodiment defines a first class of workloads with an $IPC_B/IPC_S$ ratio below 1.3, a second class of workloads with an $IPC_B/IPC_S$ ratio below 1.5, and a third class of workloads with an $IPC_B/IPC_S$ ratio above (or equal to) 1.5.

Figure 17:
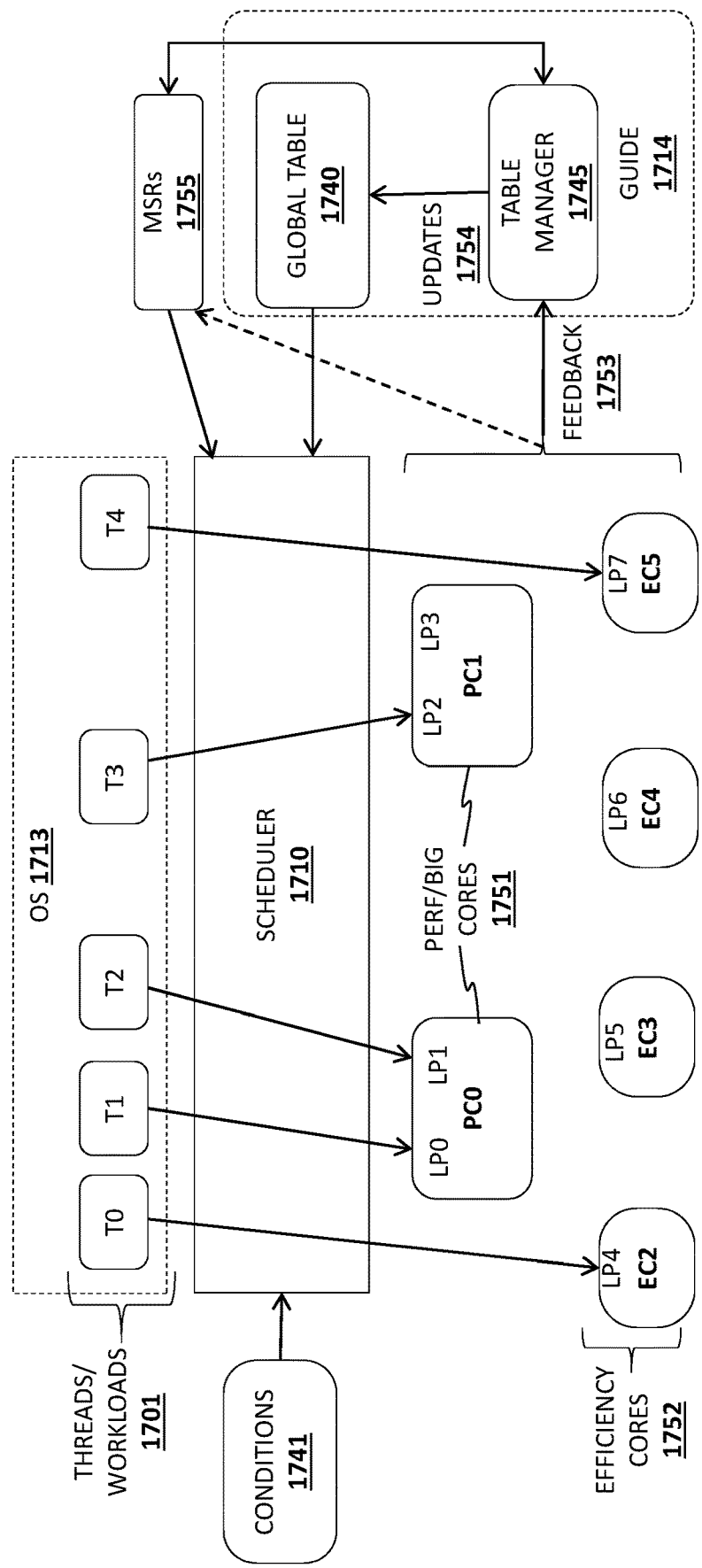
FIG. 17 illustrates a scheduler using hardware guide data to schedule threads on a set of logical processors.

One embodiment of the invention maintains a global view of the performance and energy data associated with different workloads and core types as well as different classes of big/little IPC values. As shown in FIG. 17, in one implementation, this is accomplished with a global table 1740 which stores the performance, energy, and other data for each type of core 1751-1752 and/or logical processor (LP). The global table 1740 and other logic shown in FIG. 17 (e.g., table manager 1745) may be implemented in hardware or by a combination of hardware and software.

For the purpose of illustration, two types of cores are shown in FIG. 17: performance cores 1751 (sometimes referred to as "big" cores) and efficiency cores 1752 (sometimes referred to as "little" cores). Note, however, that various additional cores and alternate combinations of big/little cores may be used.

In one embodiment, a scheduler 1710 maps threads/workloads 1701 to cores 1751-1752 and/or logical processors LP0-LP7 based on current operating conditions 1741 and the performance and energy data from global table 1740 (described in greater detail below). In one embodiment, the scheduler 1710 relies on (or includes) a guide/mapping unit 1714 to evaluate different thread/logical processor mappings in view of the global table 1740 to determine which thread should be mapped to which logical processor. The scheduler 1710 may then implement the mapping. The scheduler 1710, guide/mapping unit 1714, table manager 1745, and global table 1740 may be implemented in hardware/circuitry programmed by software (e.g., by setting register values) or by a combination of hardware and software.

The currently detected operating conditions 1741 may include variables related to power consumption and temperature, and may determine whether to choose efficiency values or performance values based on these conditions. For example, if the computing system is a mobile device, then the scheduler 1710 may perform mapping using efficiency options more frequently, depending on whether the mobile device is currently powered by a battery or plugged into an electrical outlet. Similarly, if the battery level of the mobile computing system is low, then the scheduler 1710 may tend to favor efficiency options (unless it would be more efficient to use a large core for a shorter period of time). As another example, if a significant amount of power of the overall power budget of the system is being consumed by another processor component (e.g., the graphics processing unit is performing graphics-intensive operations), then the scheduler 1710 may perform an efficiency mapping to ensure that the power budget is not breached.

One embodiment of a global table 1740, shown below as Table B, specifies different energy efficiency and performance values for each core 1751-1752 within each defined class (e.g., $Eff_{02}$, $Perf_{11}$, etc.). The cores are associated with a logical processor number (LP0-LPn) and each logical processor may represent any type of physical core or any defined portion of a physical core, including an entire core.

In one embodiment, a table manager 1745 performs updates to the global table 1740 based on feedback 1753 related to the execution of the different threads/workloads 1701. The feedback may be stored in one or more MSRs 1755 and read by the table manager 1745.

The first time a thread/workload is executed, it may be assigned a default class (e.g., Class 0). The table manager 1745 then analyzes the feedback results when executed in the default class, and if a more efficient categorization is available, the table manager 1745 assigns this particular thread/workload to a different class. In one embodiment, the feedback 1753 is used in one embodiment to generate an index into the global table 1740. The classes in this embodiment are created based on ranges of $IPC_B/IPC_S$ as described above.

TABLE B

| Class 2 | | Class 1 | | Class 0 | | |
|---|---|---|---|---|---|---|
| Energy Eff. | Perf | Energy Eff. | Perf | Energy Eff. | Perf | Cores |
| $Eff_{02}$ | $Perf_{02}$ | $Eff_{01}$ | $Perf_{01}$ | $Eff_{00}$ | $Perf_{00}$ | LP0 |
| $Eff_{12}$ | $Perf_{12}$ | $Eff_{11}$ | $Perf_{11}$ | $Eff_{10}$ | $Perf_{10}$ | LP1 |
| | | | | | | ... |
| $Eff_{n2}$ | $Perf_{n2}$ | $Eff_{n1}$ | $Perf_{n1}$ | $Eff_{n0}$ | $Perf_{n0}$ | LPn |

In one embodiment, the scheduler 1710 uses the global table 1740 and associated information to realize a global view of the different core types and corresponding performance and energy metrics for different classes. Extensions to existing schedulers may add new columns per class type. In one embodiment, the different classes enable an operating system or software scheduler to choose different allocation mechanisms for a workload based on the class of that workload.

In one embodiment, Class 0 is defined as a default class which maintains legacy support and represents the median case of the curve. In this embodiment, the guide/mapping unit 1714 and/or scheduler 1710 uses this default class when no valid data has been collected for the current thread. As described above, the table manager 1745 may evaluate feedback 1753 related to the execution of the thread in the default class and provide an update 1754 to the global table 1740 if a different class is more appropriate. For example, it may categorize the thread into Class 1 if the $IPC_B/IPC_S$ ratio of the thread is greater than a first specified threshold (e.g., 1.5) and categorize the thread into Class 2 if the $IPC_B/IPC_S$ ratio is less than a second threshold (e.g., 1.3).

The different columns per class in the global table 1740 may be specified via one or more control registers. For example, in an x86 implementation, the columns may be enumerated by CPUID[6].EDX[7:0] (e.g., for a table with 7-1 different columns per class). The operating system (OS) 1713 and/or scheduler 1710 can learn which line is relevant for each logical processor by one or more bits in EDX (e.g., CPUID.6.EDX[31-16]=n, where n is the index position which the logical processor's line is set) and can also determine the number of classes via a value in EDX (e.g., indicated by CPUID.6.EDX[11:8]). The OS can calculate the location of each logical processor line in the HGS table by the following technique:

If HGS+ is enabled

> HGS Base Addr+8+FLOOR((# of classes\*# of support capabilities bitmap set bits−1)/8+1)\*8\* (*LPn* row index+1)

else (HGS+ is disabled–legacy HGS)

> HGS Base Addr+8+8\*(*LPn* row index+1)

The size of the HGS table can be enumerated by CPUID [6].EDX[11:8]

The OS can enumerate about the legacy HGS basic support from CPUID[6].EAX[19] and about the newer HGS+support from CPUID[6].EAX[23]

In one embodiment, the performance capability values are non-semantic and do not necessarily reflect actual performance.

The performance columns in the table store relative performance values between the logical processors represented in the different rows. One embodiment of the interface provides for sharing of lines with a plurality of different logical processors that belong to the same core type, thereby providing for reasonable comparisons.

For each defined class, the ratio of performance values between cores within the same column such as $$Perf_{ijk} = \frac{Perf_{ik}}{Perf_{jk}}$$

provides a rough comparison but does not provide an actual performance value. Similarly, the ratio of energy efficiency values in a column such as $$Enery_{ijk} = \frac{Energy_{ik}}{Energy_{jk}}$$

for each logical processor provides a relative comparison, but does not reflect the actual energy consumed.

In one embodiment, the table manager 1745 updates the global table 1740 when the relative performance or energy value has experienced a significant change that can impact scheduling, such as when the order between the cores or the difference between the cores changes. These changes can be specified in one or more columns and, for each column that was updated, the column header is marked to indicate that the change was made. In addition, a status bit may be set in a control register to indicate that an update occurred. For example, in some x86 implementations, the status bit is set in a particular model-specific register (MSR).

The global table 1740 can be updated dynamically as a result of physical limitations such as power or thermal limitations. As a result, part or all of the performance and energy class value columns may be updated and the order in which a core with the best performance or energy is selected may be changed.

When updates like this happen, the hardware marks the column(s) that was updated in the global table 1740 (e.g., in the column header field). In addition, in one embodiment, the time stamp field is updated to mark the last update of the table.

In addition, the thermal status registers may also be updated and, if permitted by the OS, the thermal interrupts. An interrupt may also be generated to notify the OS about the changes. Following the setting of the thermal updates, the table manager 1745 may not update the global table 1740 any more until permitted by the OS (e.g., the OS clears the log bit). This is done in order to avoid making changes while the OS is reading the table.

Given that that different classes may be impacted in a different way for different physical limitations, one embodiment of the invention provides the ability to update only selected table classes. This configurability provides for optimal results even when the physical conditions are changed. Following an indication that the order of the class performance or energy is changed, the OS may reschedule software threads in accordance with each software thread's class index.

In one embodiment, in response to detected changes, a thread-level MSR 1755 reports the index into the current thread column to the OS 1713 and/or scheduler 1710 as well as a valid bit to indicate whether the reported data is valid. For example, for a thread-level MSR 1755, the following bits may provide indications for RTC (run time characteristics):

Bit 7:0—Application class index of the table, representing the latest "Application Class" executed on this hardware thread;

Bit 63—Valid bit; if set to 1, the OS/scheduler can use it, otherwise the class index should be ignored In one embodiment, the valid bit is set or cleared based on the current state and operational characteristics of the microarchitecture. For example, the data may not be valid following a context switch of a new thread 1701 until the hardware (e.g., the table manager 1745) can evaluate or otherwise determine the characteristics of the new thread. The valid bit may also be adjusted when transitioning between specific security code flows. In circumstances where the valid bit is not set, the scheduler 1710 may ignore the feedback data and use the last index known to be valid.

In one embodiment, the OS 1713 and/or scheduler 1710 reads this MSR 1755 when swapping out a context in order to have the most up-to-date information for the next context swapped in. The OS 1713 and/or scheduler 1710 can also read the MSR 1755 dynamically during runtime of the current software thread. For example, the OS/scheduler may read the MSR 1755 on each tick of the scheduler 1710.

In order for the hardware (e.g., the table manager 1745) to have the time required to learn about the new thread and ensure the validity of the report index after the new context is swapped in, one embodiment of the invention provides the option to save and restore the microarchitectural metadata that includes the history of the index detection. In one implementation, this is accomplished using the MSR 1755 which can be ether read or written as a regular MSR or by utilizing the processor's save and restore mechanisms (e.g., such as XSAVES/XRESROS on an x86 implementation). For example:

Thread level Scope MSR (Read/Write)
Bit 63:0—software thread, hardware feedback history metadata.

In one implementation, the OS 1713 and/or scheduler 1710 reads this metadata when swapping in the thread and updates it during execution and/or when swapping out the same thread.

In some implementations where metadata is not supported, prediction history is still reset during a context switch in order to enable valid feedback that will not be impacted from previous execution of the software thread. This reset data may be enabled if the OS is configured to "opt-in" support of history reset every time that IA32_KENTEL_GS_BASE is executed. Other OS-based context switch techniques may also be used. In another embodiment, a specific MSR is enabled with a control bit that forces resetting the history. This control MSR can be ether saved and restored by XSAVES/XRESORS or manually used by the OS on every context switch. Another embodiment resets the history via a thread level config MSR (as described below) that enables the option for the OS to manually reset the history.

The OS 1713 and/or scheduler 1710 can enable and disable the extension of the global table 1740 via an MSR control bit. This may be done, for example, to avoid conflicts with legacy implementations and/or to avoid power leakage. For example, the operating system may dynamically disable the features described herein when running on legacy systems. While disabled, the feedback MSR thread level report is invalid. Enabling can be done at the logical processor level in order to provide, for example, the VMM the option to enable the techniques described herein for part of an SoC based on each VM usage mode (including whether the VM supports these techniques).

In one particular embodiment, the thread level configuration is implemented as follows:

IA32_HW_FEEDBACK_THREAD_CONFIG provides Read/Write thread level scope (0x17D3)
Bit 0: Enables logical processor support for the scheduling techniques described herein. When set to 1, enables the support of the thread level hardware feedback and resets its history. Default: 0.
Bit 1: WRMSR_IA32_KERNEL_GS_BASE_CLEAR_HGS_HISTORY: when set, WRMSR of IA32_KERNEL_GS_BASE resets the prediction history. Default: 0

Bit 2: Reset the history command bit, always reads as 0, reset the prediction history when set (written with '1')

In one implementation, the enabling and disabling is performed via a package-level MSR. For example, in an x86 implementation the following MSR may be specified:

IA32_HW_FEEDBACK_CONFIG
Bit 0—Enable. When set to 1, this bit enables the hardware feedback interface described herein. The default is 0.
Bit 1—Enable. When set to 1, this bit enables multiple class support. The extra classes columns in the global table 1740 are valid only while bit 1 is set. Setting this bit enables the thread level feedback 1753 sent to the MSR 1755 to support valid report class indices.

As mentioned, when a new thread is to be executed, embodiments of the invention identify the class associated with the thread (or the default class) and select the logical processor (LP) available within that class having the highest performance and/or best energy efficiency values (depending on the current desired power consumption). If the optimal logical processor is not available, one embodiment of the invention determines the next best logical processor and either schedules the new thread for execution on the next best logical processor, or migrates a running thread from the optimal logical processor to make room for the new thread. In one embodiment, the decision to migrate or not migrate the running thread is based on a comparison of performance and/or energy values associated with the new thread and the running thread.

For a "High Priority" thread, the relevant column is determined based on the thread class index (k). In one embodiment, the index is provided by a feedback MSR 1755. On the thread performance class column (k), a row is identified with the highest performance value. If the corresponding logical processor is free, then the thread is scheduled on this logical processor.

Alternatively, if all highest performance logical processors are occupied, the performance class column (k) is then searched for a free logical processor, working from highest to lowest performance values. When one is located, the thread may be scheduled on the free logical processor or a running thread may be migrated from the preferred logical processor and the new thread may be scheduled on the preferred logical processor.

In this embodiment, the scheduler 1710 may evaluate whether to migrate an existing thread to a different logical processor to ensure a fair distribution of processing resources. In one embodiment, comparisons are made between the different performance values of the different threads and logical processors to render this decision, as described below.

Figure 18:
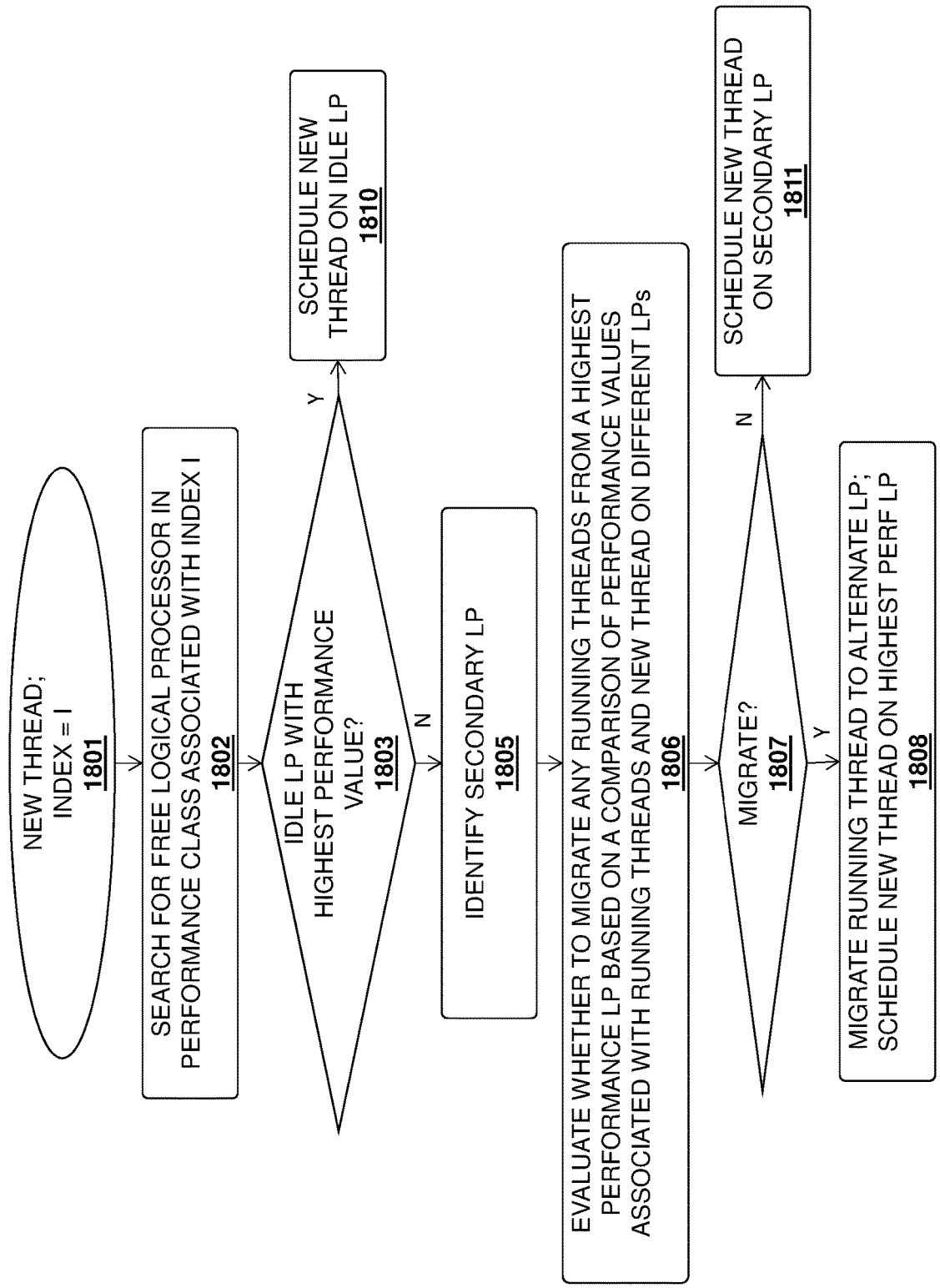
FIG. 18 illustrates a method in accordance with one embodiment of the invention.

FIG. 18 illustrates a method in accordance with one embodiment of the invention. The method may be implemented on the architectures described above, but is not limited to any particular architecture.

At 1801, a new thread is received and must be scheduled for execution on a logical processor. At 1802, the index of the new thread (I) is used to search for a free logical processor in the performance class associated with the new thread (e.g., one of the columns in the global table 1740).

If there is an idle logical processor with the highest performance value, determined at 1803, then the new thread is scheduled on the idle logical processor at 1810. If not, then at 1805, a secondary logical processor is identified at 1805. For example, the scheduler may search down the column in the global table 1740 to identify the logical processor having the second highest performance value.

At 1806, an evaluation is performed to determine whether to migrate any running threads from a logical processor which would be a highest performance LP for the new thread to a different logical processor to make room for the new thread on the highest performance logical processor. In one embodiment, this evaluation involves a comparison of the performance values of the running thread and the new thread on the highest performance logical processor and one or more alternate logical processors. For the new thread, the alternate logical processor comprises the secondary processor (i.e., which will provide the next highest performance for the new thread). For the running thread, the alternate logical processor may comprise the secondary logical processor (if it will provide the second highest performance) or another logical processor (if it will provide the second highest performance).

In one particular implementation, the ratio of the performance on highest performance LP over performance on the alternate LP for both the new thread and the running thread. If the ratio for the new thread is greater, then the running thread is migrated to its alternate logical processor. if the ratio for the running thread is greater, then the new thread will be scheduled on its alternate logical processor. The following are example ratio calculations:

$$\text{New Thread Comp Value} = \text{Perf}_{new\ thread\ highest} / \text{Perf}_{new\ thread\ alternate}$$

$$\text{Running Thread Comp Value} = \text{Perf}_{running\ thread\ highest} / \text{Perf}_{running\ thread\ alt}$$

If the above ratio is greater for the new thread, determined at 1807, then the running thread is migrated to its alternate logical processor at 1808 (i.e., the LP on which it will have the second highest performance) and new thread is scheduled to execute on its highest performance logical processor. If the ratio is greater for the running thread, then the new thread is scheduled on the secondary LP (which will provide it with the second highest performance).

In one embodiment, when energy efficiency is selected as the determining factor, the same techniques as described above are implemented to determine the logical processor for the new thread but using the efficiency class data from the global table 1740 instead of the performance class data. For example, at 1802, the index of the new thread (I) is used to search for a free logical processor in the efficiency class associated with the new thread. If there is an idle logical processor with the highest efficiency value, determined at 1803, then the new thread is scheduled on the idle logical processor at 1810. If not, then at 1805, a secondary logical processor is identified at 1805. For example, the scheduler may search down the column in the global table 1740 to identify the logical processor having the second best efficiency value. Then, at 1806, an evaluation is performed to determine whether to migrate any running threads from a logical processor which would be a highest efficiency LP for the new thread to a different logical processor to make room for the new thread. To render this decision, efficiency ratios may be determined as described above for performance:

$$\text{New Thread Comp Value} = \text{Eff}_{new\ thread\ highest} / \text{Eff}_{new\ thread\ alternate}$$

$$\text{Running Thread Comp Value} = \text{Eff}_{running\ thread\ highest} / \text{Eff}_{running\ thread\ alt}$$

As with performance, the thread with the larger index is executed on the highest efficiency logical processor, while the other thread is run (or migrated) to an alternate logical processor.

The above analysis may be performed to allocate and migrate threads in the same or different performance and efficiency classes. If the new thread has a different class index as the other threads in busy logical processors, then the performance or efficiency ratio is determined using the highest performance or efficiency value over the next best performance or efficiency value for each of the threads currently running and/or new threads to be scheduled. Those threads with the highest ratios are then allocated to the highest performance or efficiency logical processors while the others are scheduled (or migrated) on the next best performance or efficiency logical processors.

In one embodiment, in order to migrate a running thread, the ratio of the new thread must be greater than the running thread by a specified threshold amount. In one embodiment, this threshold value is selected based on the amount of overhead required to migrate the running thread to the new logical processor (e.g., the processing resources, energy, and time consumed by the migration). This ensures that if the ratio of the new thread is only slightly higher than that of the running thread, then the running thread will not be migrated.

In one embodiment, the scheduler 1710 performs a thread allocation analysis periodically (e.g., every 15 ms, 20 ms, etc) to perform the above performance and/or efficiency comparisons. If a higher performance or improved energy efficiency option is available, it will then migrate one or more threads between logical processors to achieve this higher performance or higher efficiency option.

Some existing scheduling implementations provide a global view of the performance and energy characteristics of different core/processor types. However, these implementations assume the same level of big/little $IPC_S$ and take the median value of all possible traces while ignoring the actual differences between different types of software threads. The embodiments of the invention address this limitation by considering these differences.

Apparatus and Method for Dynamic Control of Microprocessor Configurations

Embodiments of the invention provide for dynamically updating multiple processor parameters at runtime, including core count increases or decreases, to achieve the expected base frequencies and other performance parameters specific to each such configuration (e.g., such as thermal design power (TDP), Turbo frequency profiles, etc.). These embodiments may operate using cooperation between the operating system (OS) and the processor/system hardware. One particular implementation builds on the hardware-guided scheduling (HGS) techniques described above to allow the OS to idle/activate cores on behalf of the hardware.

Multiple types of servers are often needed to handle diverse workloads and usages. Purchasing and managing multiple types of servers introduces complexity and increases cost. The embodiments of the invention address these limitations through runtime configurations which are made visible to the operating system and/or other privileged software (e.g., virtual machine monitor (VMM)/hypervisor) so running tasks are not adversely affected.

Referring again to FIG. 17, hardware-guided scheduling as described above enables an OS scheduler 1710 to determine from hardware such as guide logic 1714, the capabilities of each of the cores 1751-1752 within a CPU at runtime. In one embodiment, 8 bytes are specified for each core (e.g., via MSRs 1755 and/or the global table 1740) to communicate core-specific attributes to the OS scheduler 1710. In one embodiment, a first byte defines a scalar performance attribute. A value of 0 in this scalar performance attribute is used to inform the scheduler 1710 that the core must be disabled and not used as it offers a performance level of 0. Any other value indicates an appropriate performance level that the core offers to the OS 1713.

Using guide scheduling, in response to the selection of a new speed select configuration, the hardware guide 1714 notifies the OS scheduler 1710 which may disable or otherwise not use the "unavailable" cores in that configuration. The operations the scheduler 1710 and/or OS 1713 may take include but are not limited to (1) putting the "unavailable" cores into a deep low power state (e.g., a C-state) essentially power-gating those cores, and (2) steering interrupts away from the "unavailable" cores to ensure the cores are not pulled out of the low power state. Similar operations may also be performed by the BIOS system management mode (SMM) handler to ensure SMM activity does not wake the "unavailable" cores. One embodiment also disables system management interrupts (SMIs) to the "unavailable" cores.

Figure 19:
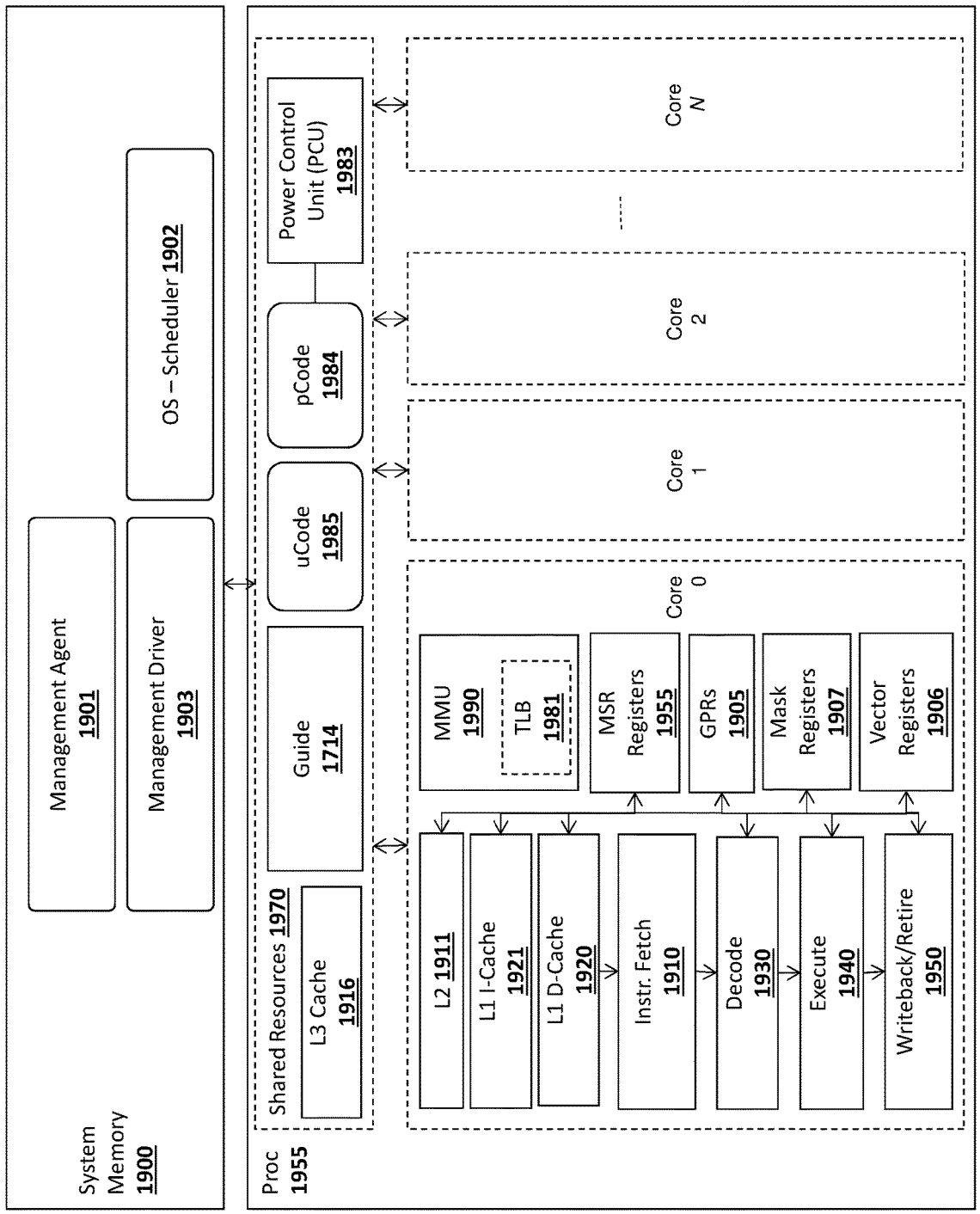
FIG. 19 illustrates an architecture on which embodiments of the invention may be implemented.

FIG. 19 illustrates one embodiment of a processor 1955 for implementing the techniques described herein. This embodiment includes a plurality of cores 0-N for simultaneously executing instructions of a plurality of threads and a set of shared (or "uncore") data processing resources 1970.

While details of only a single core (core 0) are illustrated, each of the other cores (cores 1-N) may be configured with the same architecture. Alternatively, cores 0-N may comprise heterogeneous cores with different microarchitectural features (e.g., low power cores and high performance cores, cores compatible with different instruction set architectures, etc).

Core 0 includes an instruction fetch unit 1910 for fetching instructions of threads from system memory 1900 and/or various cache levels including a Level 1 (L1) instruction cache 1921, a Level 2 (L2) cache 1911, and a shared Level 3 cache 1916. A decoder 1930 decodes the fetched instructions (e.g., into a plurality of microoperations or uops) and the instructions (or uops) are executed by execution circuitry 1940. Writeback/retire circuitry 1950 commits execution results to the architectural state and retires the instructions, typically freeing reserved execution resources.

Core 0 includes a memory management unit (MMU) 1990 comprising circuitry for performing memory operations (e.g., such as load/store operations) such as address translations. For example, address translation circuitry of the MMU 1990 may implement address translation to access page tables in memory 1900 and to cache the translations in a TLB 1981.

A set of model-specific registers (MSRs) 1955 store various forms of control data including the guide scheduling data described herein. The illustrated core architecture also includes a set of general purpose registers (GPRs) 1905, a set of vector registers 1906, and a set of mask registers 1907. In one embodiment, multiple vector data elements are packed into each vector register 1906 which may have a 512 bit width for storing two 256 bit values, four 128 bit values, eight 64 bit values, sixteen 32 bit values, etc. However, the underlying principles of the invention are not limited to any particular size/type of vector data. In one embodiment, the mask registers 1907 include eight 64-bit operand mask registers used for performing bit masking operations on the values stored in the vector registers 1906 (e.g., implemented as mask registers k0-k7 described herein). However, the underlying principles of the invention are not limited to any particular mask register size/type.

The shared resources 1970 also include the guide unit 1714 which, as previously described, evaluates different mappings of threads to logical processors or cores in view of the global table 1740 to determine which thread should be mapped to which logical processor or core. Other shared resources 1970 include firmware microcode ("uCode") 1985 executed by one or more of the cores 0-N and power control microcode ("pCode") 1984 executed by a power control unit (PCU) 1983 which manages the power consumption of the cores and the shared resources 1940. For example, in one embodiment, the PCU 1983 independently adjusts the voltage and/or frequency of each of the cores 0-N and shared resources 1970 using techniques such as dynamic voltage and frequency scaling (DVFS) so ensure that the thermal, performance, and efficiency requirements of the processor 1955 are met (e.g., maintaining overall power consumption under a specified threshold).

In one embodiment, a management agent 1901 running on the processor 1955 determines the current power/performance configurations of the cores 0-N by communicating with the PCU 1983 via a management driver 1903. The management agent 1901 may then request changes to the power/performance configuration through the management driver 1903. For example, in one embodiment, in response to the requested changes, the pCode 1984 executing on the PCU 1983 updates the current power/performance configuration of the cores, writes the changes to a specified region in memory (e.g., a designated guide scheduler region), restricts the frequency of one or more cores to a specified minimum value, and generates an interrupt to the OS/scheduler 1902. In response, the OS/scheduler 1902 reads the specified region of memory to identify the idle cores and reconfigures its scheduling policy based on the identity of the idle cores.

In one embodiment, the management driver 1903 executes in a privileged execution mode such as a "kernel mode." As such, the management driver 1903 is provided with access to those privileged system components that manage power (e.g., pCode/PCU), input/output channels, plug and play memory, processes and threads, and secure memory regions, to name a few. A such, the management driver 1903 may be used to access the pCode 1984 and implement the techniques described herein while keeping the OS/scheduler 1902 unchanged.

Figure 20:
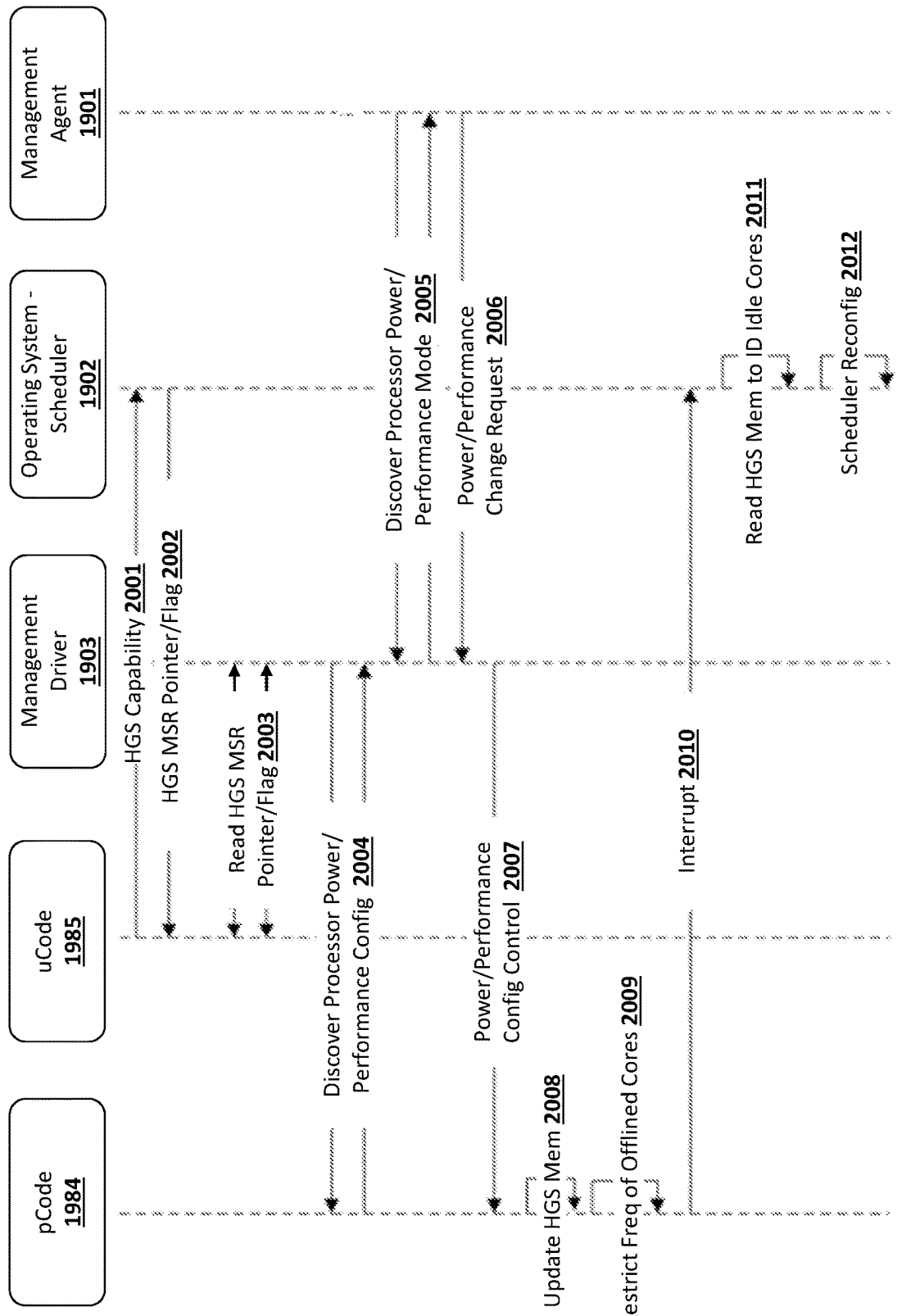
FIG. 20 illustrates a first example comprising a set of transactions for managing processor cores.

FIG. 20 illustrates an example sequence of transactions between the management agent 1901, OS/scheduler 1902, management driver 1903, uCode 1985 (executed on a core), and pCode (executed on the PMU) to implement one embodiment of the invention. In transaction 2001, the OS/scheduler 1902 determines the HGS capabilities (e.g., by issuing a CPUID instruction or comparable instruction for determining processor capabilities).

Once HGS capabilities are determined, in transaction 2002 the OS/scheduler 1902 issues one or more instructions to configure the MSR (or virtual MSR (vMSR) in a virtualized environment) used for guided scheduling as described herein. For example, one MSR may be set with a pointer or index to identify current thread data within the global table 1740 and/or a region in system memory associated with the thread. One or more HGS (hardware guided scheduling) flags may also be set and read from the MSR(s) to indicate the guided scheduling configuration.

At transaction 2003, the management driver 1903 reads the data from the MSR (i.e., via the uCode 1985) including any pointers/flags. Then, at 2004, the management driver 1903 reads data associated with the current power/performance configuration of the cores, as specified by the pCode 1984 running on the PCU. In one embodiment, the power/performance configuration data is read from a designated region in memory (e.g., a "mailbox") through which messages and/or data are passed between the PCU/pCode and other system components. At transaction 2005, the management driver 1903 provides the power/performance configuration data to the management agent 1901. At transaction 2006, the management agent 1901 generates a power/performance configuration control message indicating one or more changes to the power/performance configuration. For example, in one embodiment, the request is to turn off one or more of the cores 0-N based on the current thread workloads. This request is passed to the PCU/pCode 1984 by the management driver 1903 at transaction 2007.

In one particular implementation where Intel Speed Select (ISS) Technology is supported by the processor 1955, the changes to the power/performance configuration are requested in accordance with ISS. In this case, an ISS performance profile may be specified in transactions 2006-2007 for dynamic reconfiguration of the processor cores at different core counts, core/uncore frequencies, thermal design power (TDP) setting, etc. However, it should be noted that the underlying principles of the invention are not limited to ISS, or any other power/performance mechanism.

In one embodiment, in response to the power/performance configuration control message 2007, the pCode/PCU performs the requested configuration change. When complete, the pCode/PCU updates the guide scheduling memory region at transaction 2008 to indicate the new configuration. The "guide scheduling region" may be any region of system memory (or cache memory) accessible to the OS/scheduler 1902. At 2009, the pCode/PCU restricts the frequency of any cores taken offline. This transaction may not be required in all implementations, but may be used in cases where there is no guarantee that the operating system will keep the cores in the offlined/idled/deep sleep c state. Thus, the pCode 1984 will restrict the frequency of these cores to some minimal value.

An interrupt 2010 is generated by the pCode 1984 to the OS/scheduler 1902 to inform the OS/scheduler 1902 that a configuration change has occurred. In one embodiment, the interrupt 2010 is a thermal status interrupt, but any type of interrupt may be used. At transaction 2011, in response to the interrupt, the OS/scheduler 1902 reads the designated region in memory associated with guide scheduling to identify the idle/offline cores. At transaction 2012, the scheduler is reconfigured based on the identity of the idle/offline cores. For example, the scheduler may remove the idle cores from the set of cores available for scheduling or may re-rank the cores, assigning the lowest ranking to the idle cores.

The transactions shown in FIG. 20 may be employed on a computing device which requires a management driver 1903 to intercept requests and access the pCode 1984 to update the HGS memory (e.g., at 2008). In other implementations, the OS/scheduler 1902 and/or management agent 1902 may directly update the HGS memory.

Figure 21:
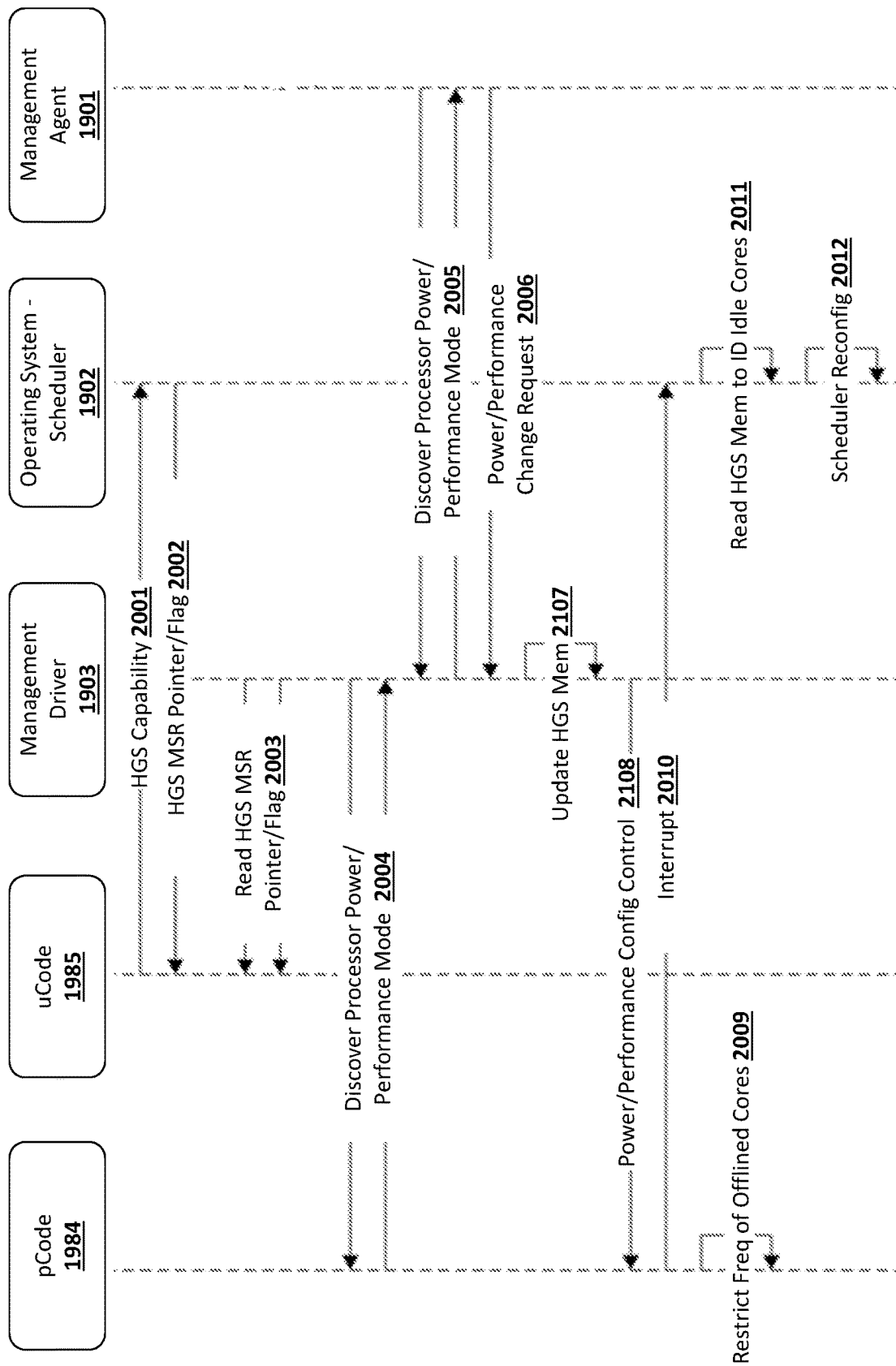
FIG. 21 illustrates a second example comprising a second set of transactions for managing processor cores.

FIG. 21 illustrates another example sequence of transactions between the management agent 1901, OS/scheduler 1902, management driver 1903, uCode 1985 (executed on a core), and pCode 1984. In this embodiment, transactions 2001-2006 and 2009 to 2012 are the same or similar to those with corresponding numbers in FIG. 20. At transaction 2107 in FIG. 21, however, the management driver 1903 itself updates the guide scheduler (HGS) memory region instead of the pCode 1984. At transaction 2108, the management driver 1903 then transmits a power/performance configuration control message to the pCode (e.g., via a mailbox memory region). Because the HGS memory was updated at transaction 2107, the pCode does not need to update the HGS memory and responsively generates an interrupt 2010 to the OS/scheduler 1902 and restricts the frequency of the offlined cores at transaction 2009 (e.g., for the reasons discussed with respect to FIG. 20).

As in FIG. 20, the interrupt 2010 informs the OS/scheduler 1902 that a configuration change has occurred. The interrupt 2010 may be a thermal status interrupt, but any type of interrupt may be used. At transaction 2011, in response to the interrupt, the OS/scheduler 1902 reads the HGS memory region (i.e., the designated region in memory associated with guide scheduling) to identify the idle/offline cores. At transaction 2012, the scheduler is reconfigured based on the identity of the idle/offline cores. For example, the scheduler may remove the idle cores from the set of cores available for scheduling or may re-rank the cores, assigning the lowest ranking to the idle cores.

In summary, embodiments of the invention provide updates to the hardware guide scheduling (HGS) data structure by hardware or by an OS kernel mode driver while keeping the OS layer unchanged, resulting in a standardized, fixed OS implementation. The embodiments of the invention may be used to switch between multiple SKU configurations at runtime without requiring a reboot, thereby enabling new applications and use-cases for data-center, private cloud, public cloud, personal computing, HPC and other market segments.

In the foregoing specification, the embodiments of invention have been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

EXAMPLES

The following are example implementations of different embodiments of the invention.

Example 1. A processor comprising: a plurality of cores to be allocated to form a first plurality of logical processors (LPs) to execute threads, wherein one or more logical processors (LPs) are to be associated with each core of the plurality of cores; scheduling guide circuitry to: monitor execution characteristics of the first plurality of LPs and the threads; generate a first plurality of LP rankings, each LP ranking including all or a subset of the plurality of LPs in a particular order; and store the first plurality of LP rankings in a memory to be provided to a scheduler, the scheduler to schedule the threads on the plurality of LPs using the first plurality of LP rankings; a power controller to execute power management code to perform power management operations including independently adjusting frequencies and/or voltages of one or more of the plurality of cores; wherein in response to a core configuration command to deactivate a first core of the plurality of cores, the power controller or privileged program code executed on the processor are to update the memory with an indication of deactivation of the first core, wherein responsive to the indication of deactivation of the first core, the scheduler is to modify the scheduling of the threads.

Example 2. The processor of example 1 wherein responsive to the indication of deactivation of the core, the scheduling guide circuitry is to generate a second plurality of LP rankings which either do not include one or more LPs associated with the first core or which rank the one or more LPs associated with the first core lower than any other LPs of the first plurality of LPs.

Example 3. The processor of example 2 wherein the privileged program code comprises a management driver, the management driver to update the memory with an indication of deactivation of the first core.

Example 4. The processor of example 1 wherein responsive to the core configuration command, the power controller is to set a frequency and/or voltage restriction for the first core of the plurality of cores.

Example 5. The processor of example 4 wherein the power controller is to generate an interrupt to the scheduler to notify the scheduler to read the indication of deactivation of the first core from the memory.

Example 6. The processor of example 5 wherein the scheduler comprises an operating system (OS) scheduler.

Example 7. The processor of example 1 wherein the core configuration command is generated by a management agent executed on the processor.

Example 8. The processor of example 7 wherein the privileged program code comprises a management driver to forward the core configuration command to the power controller.

Example 9. A method comprising: associating a first plurality of logical processors (LPs) with a plurality of cores, the LPs to execute a plurality of threads; monitoring execution characteristics of the first plurality of LPs and the threads; generating first plurality of LP rankings, each LP ranking including all or a subset of the plurality of LPs in a particular order; and storing the first plurality of LP rankings in a memory to be provided to a scheduler; scheduling the threads on the plurality of LPs using the first plurality of LP rankings; executing power management code to perform power management operations including independently adjusting frequencies and/or voltages of one or more of the plurality of cores; wherein in response to a core configuration command to deactivate a first core of the plurality of cores, updating the memory with an indication of deactivation of the first core, wherein responsive to the indication of deactivation of the first core, modifying the scheduling of the threads.

Example 10. The method of example 9 wherein responsive to the indication of deactivation of the core, the scheduling guide circuitry is to generate a second plurality of LP rankings which either do not include one or more LPs associated with the first core or which rank the one or more LPs associated with the first core lower than any other LPs of the first plurality of LPs.

Example 11. The method of example 10 wherein the privileged program code comprises a management driver, the management driver to update the memory with an indication of deactivation of the first core.

Example 12. The method of example 9 wherein responsive to the core configuration command, the power controller is to set a frequency and/or voltage restriction for the first core of the plurality of cores.

Example 13. The method of example 12 wherein the power controller is to generate an interrupt to the scheduler to notify the scheduler to read the indication of deactivation of the first core from the memory.

Example 14. The method of example 13 wherein the scheduler comprises an operating system (OS) scheduler.

Example 15. The method of example 9 wherein the core configuration command is generated by a management agent executed on one or more of the cores.

Example 16. The method of example 15 wherein the privileged program code comprises a management driver to forward the core configuration command to the power controller.

Example 17. A machine-readable medium having program code stored thereon which, when executed by a machine, causes the machine to perform the operations of: associating a first plurality of logical processors (LPs) with a plurality of cores, the LPs to execute a plurality of threads; monitoring execution characteristics of the first plurality of LPs and the threads; generating first plurality of LP rankings, each LP ranking including all or a subset of the plurality of LPs in a particular order; and storing the first plurality of LP rankings in a memory to be provided to a scheduler; scheduling the threads on the plurality of LPs using the first plurality of LP rankings; executing power management code to perform power management operations including independently adjusting frequencies and/or voltages of one or more of the plurality of cores; wherein in response to a core configuration command to deactivate a first core of the plurality of cores, updating the memory with an indication of deactivation of the first core, wherein responsive to the indication of deactivation of the first core, modifying the scheduling of the threads.

Example 18. The machine-readable medium of example 17 wherein responsive to the indication of deactivation of the core, the scheduling guide circuitry is to generate a second plurality of LP rankings which either do not include one or more LPs associated with the first core or which rank the one or more LPs associated with the first core lower than any other LPs of the first plurality of LPs.

Example 19. The machine-readable medium of example 18 wherein the privileged program code comprises a management driver, the management driver to update the memory with an indication of deactivation of the first core.

Example 20. The machine-readable medium of example 17 wherein responsive to the core configuration command, the power controller is to set a frequency and/or voltage restriction for the first core of the plurality of cores.

Example 21. The machine-readable medium of example 20 wherein the power controller is to generate an interrupt to the scheduler to notify the scheduler to read the indication of deactivation of the first core from the memory.

Example 22. The machine-readable medium of example 21 wherein the scheduler comprises an operating system (OS) scheduler.

Example 23. The machine-readable medium of example 20 wherein the core configuration command is generated by a management agent executed on one or more of the cores.

Example 24. The machine-readable medium of example 23 wherein the privileged program code comprises a management driver to forward the core configuration command to the power controller.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the Figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A processor comprising:
   a plurality of cores; and
   one or more interconnects to couple the plurality of cores to memory;
   wherein in response to a core configuration command to deactivate a core of the plurality of cores, a region within the memory is updated with an indication of deactivation of the core, and
   wherein an interrupt is generated to indicate that the region within the memory is updated with the indication of deactivation of the core.

2. The processor of claim 1, wherein in response to the interrupt, the region within the memory is read to identify the deactivated core.

3. The processor of claim 1, wherein the indication of deactivation of the core is a value of a scalar performance attribute.

4. The processor of claim 3, wherein the value of the scalar performance attribute is one of a plurality of values that indicate a corresponding plurality of performance levels of the core.

5. The processor of claim 3, wherein the scalar performance attribute is stored in a model-specific register.

6. The processor of claim 3, wherein the scalar performance attribute of the core is one of a plurality of attributes of the core that are visible to an operating system scheduler.

7. The processor of claim 1, wherein in response to the core configuration command to deactivate the core of the plurality of cores, the core is put into a low power state.

8. The processor of claim 1, wherein in response to the core configuration command to deactivate the core of the plurality of cores, one or more interrupt is steered away from the core.

9. The processor of claim 1, wherein in response to the core configuration command to deactivate the core of the plurality of cores, one or more system management interrupts to the core are disabled.

10. The processor of claim 1, wherein in response to the core configuration command to deactivate the core of the plurality of cores, a frequency of the core is restricted to a value.

11. The processor of claim 1, the processor further comprises a power control unit circuitry that causes the region within the memory to be updated with the indication of deactivation of the core.

12. A method comprising:
    coupling a plurality of cores to memory of a processor via one or more interconnects;
    in response to a core configuration command to deactivate a core of the plurality of cores updating a region within the memory with an indication of deactivation of the core; and
    generating an interrupt to indicate that the region within the memory is updated with the indication of deactivation of the core.

13. The method of claim 12, wherein the indication of deactivation of the core is a value of a scalar performance attribute.

14. The method of claim 12, further comprising:
    in response to the core configuration command to deactivate the core of the plurality of cores, putting the core into a low power state.

15. A non-transitory machine-readable medium having program code stored thereon which, when executed by a machine, is capable of causing the machine to perform:
    coupling a plurality of cores to memory of a processor via one or more interconnects;
    in response to a core configuration command to deactivate a core of the plurality of cores updating a region within the memory with an indication of deactivation of the core, and
    generating an interrupt to indicate that the region within the memory is updated with the indication of deactivation of the core.

16. The non-transitory machine-readable medium of claim 15, wherein the indication of deactivation of the core is a value of a scalar performance attribute.

17. The non-transitory machine-readable medium of claim 16, wherein the scalar performance attribute is stored in a model-specific register.

18. The non-transitory machine-readable medium of claim 16, wherein the scalar performance attribute of the core is one of a plurality of attributes of the core that are visible to an operating system scheduler.

* * * * *